United States Patent
Sotoike et al.

(10) Patent No.: US 8,708,829 B2
(45) Date of Patent: Apr. 29, 2014

(54) VIDEO GAME USING SHORT RANGE COMMUNICATIONS TO ESTABLISH PAIRING AND ALTERNATE COMMUNICATIONS DURING MULTIPLAYER GAMEPLAY

(75) Inventors: Hiroki Sotoike, Kyoto (JP); Mikihiro Ishikawa, Kyoto (JP); Katsumi Ohno, Tokyo (JP); Yoshinori Matsuda, Tokyo (JP)

(73) Assignees: Nintendo, Co., Ltd., Kyoto (JP); Game Freak Inc, Tokyo (JP)

( * ) Notice: Subject to any disclaimer, the term of this patent is extended or adjusted under 35 U.S.C. 154(b) by 611 days.

(21) Appl. No.: 12/721,864

(22) Filed: Mar. 11, 2010

(65) Prior Publication Data
US 2011/0143840 A1    Jun. 16, 2011

(30) Foreign Application Priority Data
Dec. 14, 2009    (JP) ................................ 2009-282735

(51) Int. Cl.
*H04W 12/08* (2009.01)
*H04W 12/06* (2009.01)

(52) U.S. Cl.
USPC ............. 463/42; 463/7; 463/8; 463/9; 463/29

(58) Field of Classification Search
USPC ............................................. 463/7–9, 29, 42
See application file for complete search history.

(56) References Cited

U.S. PATENT DOCUMENTS

| | | | |
|---|---|---|---|
| 5,618,045 A * | 4/1997 | Kagan et al. | 463/40 |
| 7,400,594 B2 * | 7/2008 | Pereira et al. | 370/310 |
| 2003/0079003 A1 * | 4/2003 | Burr | 709/221 |
| 2009/0227282 A1 * | 9/2009 | Miyabayashi et al. | 455/552.1 |
| 2010/0257239 A1 * | 10/2010 | Roberts | 709/204 |
| 2010/0278345 A1 * | 11/2010 | Alsina et al. | 380/283 |

FOREIGN PATENT DOCUMENTS

JP    2007-259385    10/2007

* cited by examiner

*Primary Examiner* — Lawrence Galka
(74) *Attorney, Agent, or Firm* — Nixon & Vanderhye P.C.

(57) ABSTRACT

Each game apparatus participating in a network system has a wireless communication module for performing a one-to-many wireless communication with reference to identifying information and a local communication module for performing a one-to-one infrared communication without referring to it. In a case that the one-to-many wireless communication is performed, pairing processing is executed in a tournament method such that a master and a slave are first decided between its own game apparatus and any one of the game apparatuses over the local communication module, and identifying information stored on the slave side is collected into the master side. In a case that its own game apparatus becomes the only master game apparatus as a result of a series of pairing processing, it transmits a signal including identifying information of all the game apparatuses over the wireless communication module whereas in a case that its own game apparatus becomes the slave apparatus, it receives the signal.

24 Claims, 18 Drawing Sheets

FIG. 6
(a) ONE-TO-ONE INFRARED COMMUNICATIONS: INFRARED RAYS WITH HIGH DIRECTIVITY AND SHORT COVERAGE AREA IS USED FOR DATA COMMUNICATION FOR PAIRING
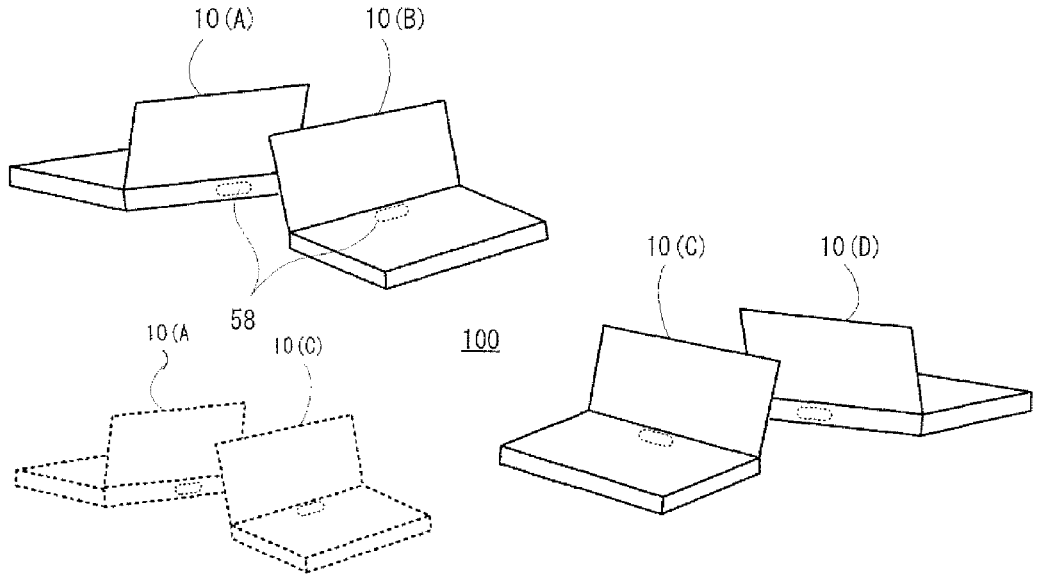
(b) ONE-TO-MANY WIRELESS COMMUNICATION: WIRELESS SYSTEM WITH LOW DIRECTIVITY AND LONG COVERAGE AREA IS USED FOR DATA COMMUNICATION FOR MATCH-UP GAME
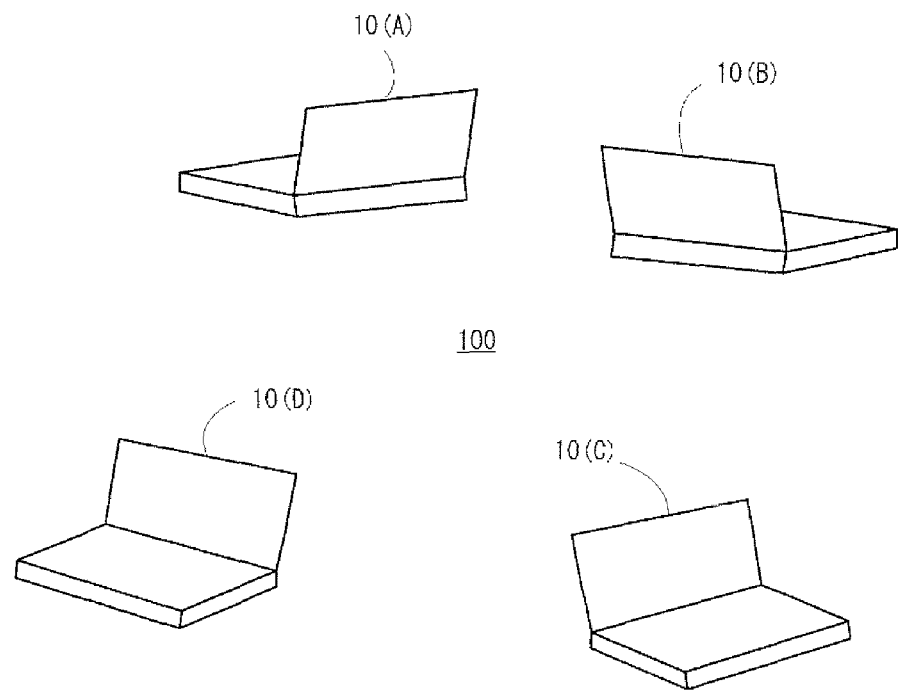

FIG. 8
(a) WHEN THE NUMBER OF PARTICIPATING GAME APPARATUSES IS 4 (ONE EXAMPLE OF POWER OF 2)
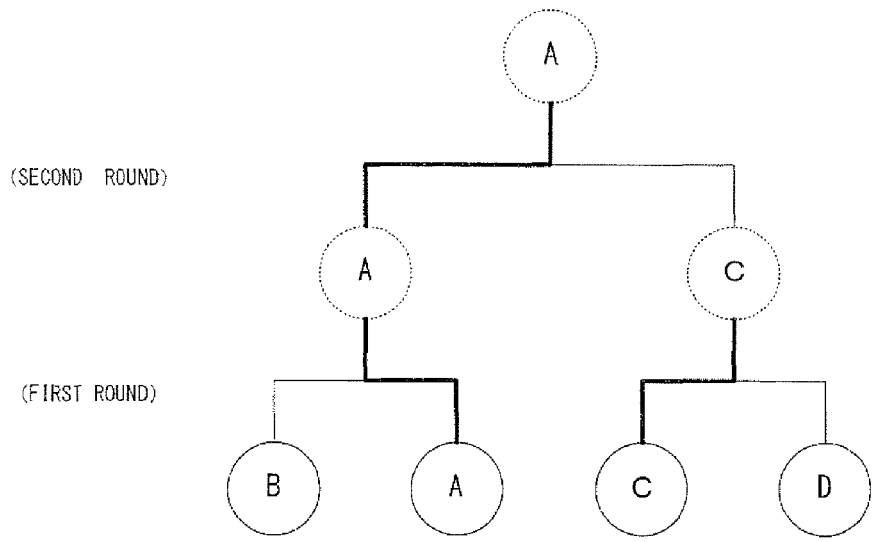
(b) TRANSITION OF ID LIST POSSESSED BY EACH MACHINE (ADDITIVE WRITING)
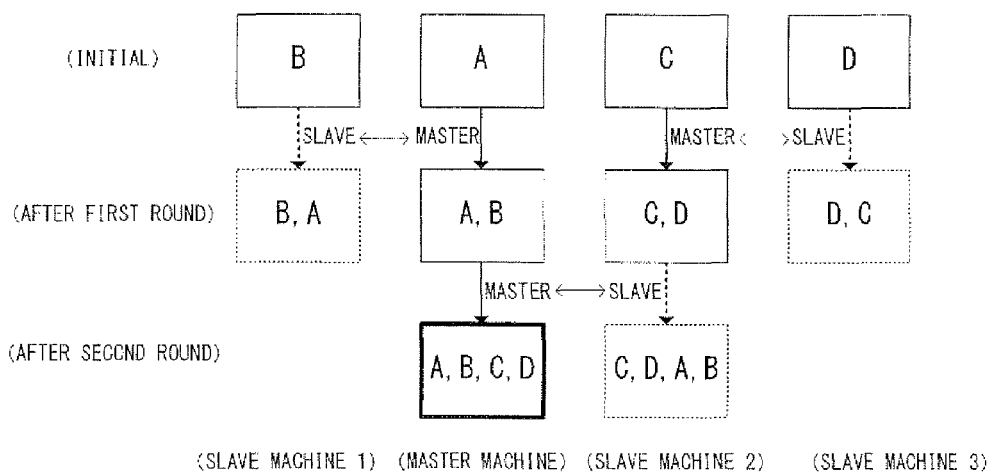
(c) DIVISION INTO TEAMS BASED ON ID LIST POSSESSED BY MASTER MACHINE (2 TEAMS WITH 2:2)
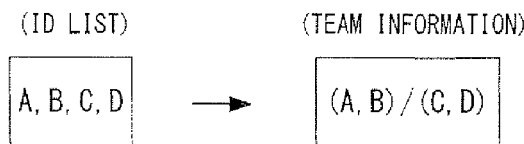

FIG. 17
(a) WHEN THE NUMBER OF PARTICIPATING GAME APPARATUSES IS 5 (EXAMPLE EXCEPT FOR POWER OF 2)
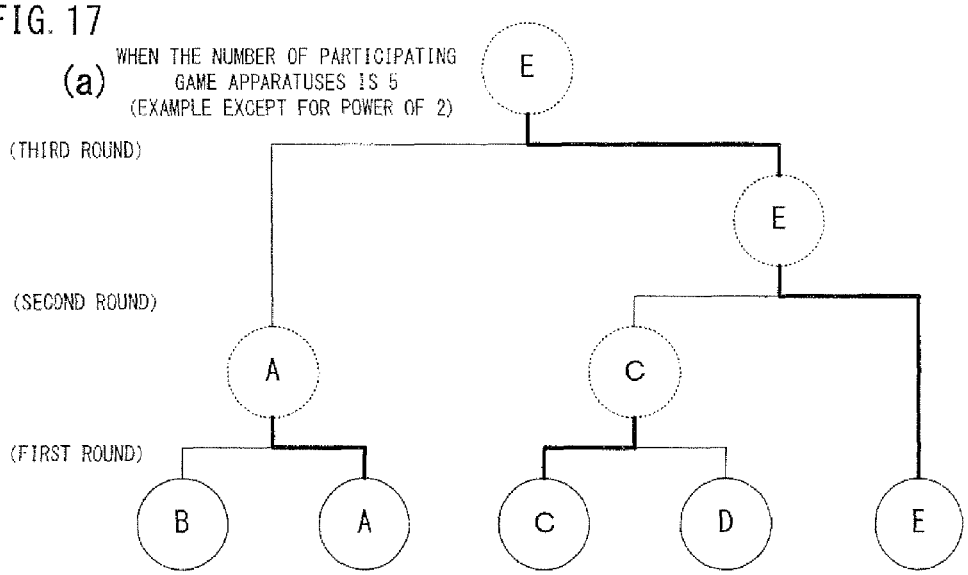
(b) TRANSITION OF ID LIST POSSESSED BY EACH MACHINE (ADDITIVE WRITING)
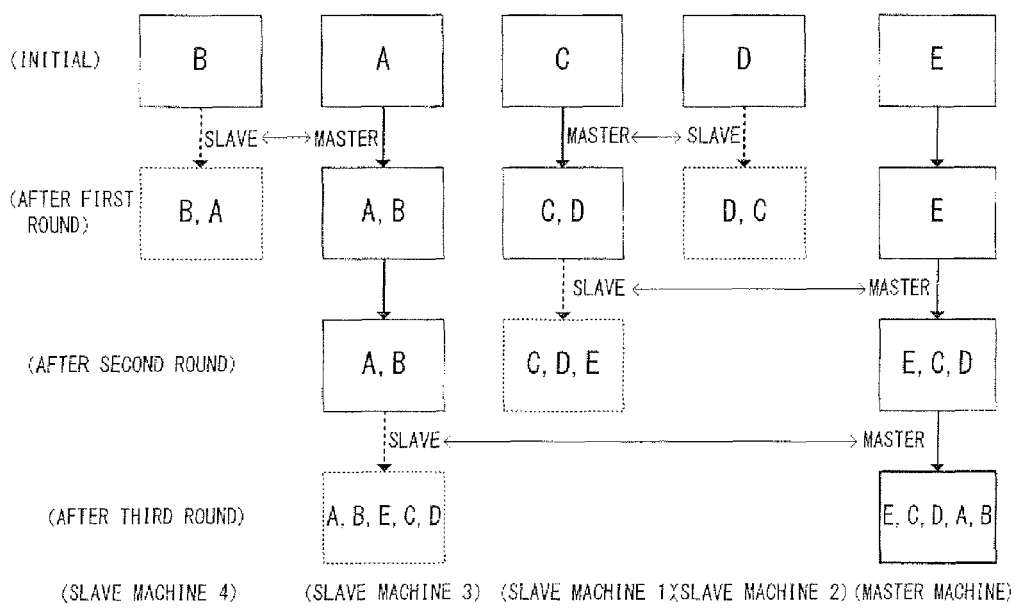
(c) DIVISION INTO TEAMS BASED ON ID LISTS POSSESSED BY MASTER MACHINE (2 TEAMS WITH 3:2)
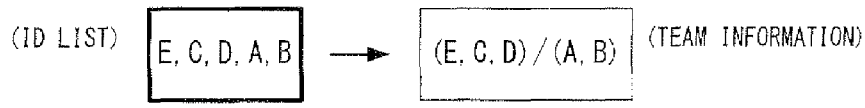

VIDEO GAME USING SHORT RANGE COMMUNICATIONS TO ESTABLISH PAIRING AND ALTERNATE COMMUNICATIONS DURING MULTIPLAYER GAMEPLAY

CROSS REFERENCE OF RELATED APPLICATION

The disclosure of Japanese Patent Application No. 2009-282735 is incorporated herein by reference.

BACKGROUND OF THE INVENTION

1. Field of the Invention

The present invention relates to a network system, a communication terminal, and a communication program. More specifically, the present invention relates to a network system, a communication terminal and a communication program which make communications in two different systems.

2. Description of the Related Art

As an apparatus of such a kind, one disclosed in a Japanese Patent Application Laid-Open No. 2007-259385 (Patent Document 1) is known. In the related art, an appliance A which desires to make a communication transmits a designation signal including an appliance ID of user's own game apparatus to an appliance B of a partner over a commutation utilizing infrared rays which does not need specification by identifying information. Successively, the appliance A transmits a search packet over a wireless LAN. In a case that the appliance B receiving the search packet has already received the designation signal transmitted from the appliance A over the infrared rays, it sends back a specification replay packet indicating that it has received the designation signal to the appliance A. Since the identifying information of the appliance B being a transmission source is included in the specification replay packet, the appliance A designates a destination to be connected over the wireless LAN as the appliance B on the basis of the identifying information, and transmits image data to the appliance B. Thus, even if the identifying information of the appliance which desires to make a connect application is unknown, by an operation of transmitting its own appliance's ID to the desired appliance over the infrared rays, it becomes possible to easily make a connection with the other appliance over the wireless LAN, etc.

However, in the related art of the Patent Document 1, only the one-to-one communication is made between the two appliances.

SUMMARY OF THE INVENTION

Therefore, it is a primary object of the present invention to provide a novel network system, a novel communication terminal and a novel communication program.

Another object of the present invention is to provide a network system in which even if three or more communication terminals each stores self-identifying information, a one-to-many wireless communication can be easily and efficiently performed, communication terminals participating in such a network system, and a communication program for it.

This invention adopts the following configurations in order to solve the above-described problems.

A first invention is a network system being made up of three or more communication terminals each storing at least self-identifying information, and each of the communication terminals comprises a first communication module for making a wireless communication with the others of the communication terminals with reference to each of the identifying information, a second communication module for making a communication with each of the communication terminals without reference to the identifying information, a pairing means for executing pairing processing of storing and collecting with any one of the communication terminals the identifying information stored in at least the one communication terminal into the other communication terminal via the second communication module prior to a start of a wireless communication by the first communication module, and repetitively executing the pairing processing of storing and collecting, with still another one of the communication terminals, the identifying information stored in at least the one communication terminal into the other communication terminal every time a first condition is satisfied in the pairing processing, and a signal transmitting and receiving means for transmitting a signal including all the identifying information to the other communication terminal via the first communication module in a case that a second condition is satisfied and receiving the signal transmitted from the other communication terminal via the first communication module when a third condition is satisfied, as a result of a series of the pairing processing by the pairing means.

In the first invention, a network system is made up of three or more communication terminals A, B, C . . . each storing at least self-identifying information. Each communication terminal, for example, the A has a first communication module and a second communication module. Thus, it becomes possible to make a wireless communication (one-to-many) with the plurality of other communication terminals B, C . . . with reference to the identifying information by the first communication module. Furthermore, it becomes possible to make a communication (one-to-one) with each of the other communication terminals B, C . . . without reference to the identifying information by the second communication module.

Each communication terminal, for example, the A stores self-identifying information, but does not necessarily store the identifying information of the other communication terminals B, C, . . . . Thus, in a case that a wireless communication by the first communication module is performed, with any one of the communication terminals, for example, the B, a pairing means executes pairing processing of storing and collecting the identifying information stored in at least the one communication terminal into the other communication terminal via the second communication module (in other words, a master and a slave are decided to thereby store the identifying information stored in the slave side into the master side), and repetitively executes the pairing processing of collecting, with still another one of the communication terminals, the identifying information stored in at least the one communication terminal into the other communication terminal every time that the first condition is satisfied (its own game apparatus becomes the master) in the pairing processing. Next, a signal transmitting and receiving means transmits a signal including the identifying information of all the collected communication terminals A, B, C . . . to the other communication terminal via the first communication module in a case that a second condition is satisfied (its own machine becomes the only master, for example), and receives the signal transmitted from the other communication terminal (the only master, for example) via the first communication module in a case that a third condition is satisfied (its own machine becomes a slave, for example), as a result of a series of the pairing processing by the pairing means. Thus, the identifying information of all the communication terminals A, B, C . . . are collected into the communication terminal which becomes the only master through the series of pairing, that is, the master machine, and each communication terminal which becomes the slave as a series of pairing, that is, each slave machine can receive a delivery of the identifying information from the master machine.

According to the first invention, even if three or more communication terminals each stores only the self-identifying information, it is possible to easily and efficiently make a transition to the wireless communication via the first communication module (one-to-many) through the pairing via the second communication module. Furthermore, a tournament system in which only the communication terminal for which the first condition is satisfied in the current pairing advances to a next pairing is adopted, and therefore, the number of pairing processing can be made less than that of the round robin system in which each communication terminal makes a pairing with all the communication terminal except for its own communication terminal.

A second invention is a network system according to the first invention, and the first communication module has a coverage area wider than that of the second communication module.

According to the second invention, the second communication module specifying a connection partner has a narrow coverage area, so that it is possible to prevent an unintended communication terminal at a distant place from erroneously being regarded as a connection partner, and it is possible to be sure to specify the connection partner. Furthermore, after the connection partner is specified, a communication is made by utilizing the first communication module, so that it is possible to make the coverage area wider than when the communication is kept by the second communication module, and even if both of the communication terminals are far away from each other in the course of the communication, it is possible to maintain the communication.

A third invention is a network system according to the first invention, and the second communication module has a directivity higher than that of the first communication module.

According to the third invention, in order to specify a connection partner, the second communication module has to be directed to a direction in which a communication terminal that is desired to be connected exists, so that it is possible to prevent an unintended communication terminal in an another direction from erroneously being regarded as a connection partner, and it is possible to be sure to specify the connection partner. Furthermore, after the connection partner is specified, a communication is made by utilizing the first communication module, so that it is possible to make the coverage area wider than when the communication is kept by the second communication module, and even if the direction of the communication terminal that is desired to be connected changes in the course of the communication, it is possible to maintain the communication.

Here, the second communication module having a narrow coverage area and/or a high directivity is suitable for a one-to-one pairing, and is corresponding to an infrared rays module, a short distance wireless communication module utilized in a contactless integrated circuit cards, etc., but it may include wire communication modules because of an extremely high directivity. On the other hand, the first communication module having a wide coverage area and a low directivity is suitable for a one-to-many wireless communication, and is corresponding to a wireless LAN module, a Bluetooth (registered trademark) module, a ZigBee (registered trademark) module, etc.

Additionally, in one embodiment, the signal transmitting and receiving means transmits and receives a signal in a broadcast system. Here, the communication terminal for which the second condition is satisfied stores the identifying information of all the communication terminals whereas the communication terminal for which the third condition is satisfied stores at least the self-identifying information, so that the transmission and reception of the signal may be performed in a multicast system or a unicast system other than the broadcast system.

A fourth invention is a network system according to the first invention, and each of the communication terminals waits until a signal from the other communication terminal is received via the first communication module in a case that the third condition is satisfied as a result of the pairing processing.

According to the fourth invention, in a case that its own communication terminal becomes a slave through the pairing, waiting is made by the first communication module, so that it is possible to efficiently transmit and receive a signal.

A fifth invention is a network system according to the first invention, and the first condition is that the identifying information stored in the other communication terminal is stored and collected into its own communication terminal in the pairing processing.

According to the fifth invention, the communication terminal which collects the identifying information performs a next pairing, capable of making pairing more efficiently than in a round robin system.

A sixth invention is a network system according to the first invention, and each of the communication terminals further comprises a connection request transmitting means for transmitting a connection request to the other communication terminal via the second communication module, and a connection request receiving means for receiving the connection request from the other communication terminal via the second communication module, and the first condition is that the connection request is received.

According to the sixth invention, the communication terminal on the collecting side of the identifying information performs a next pairing, capable of efficiently making a pairing.

A seventh invention is a network system according to the first invention, and the second condition is that the identifying information of a predetermined number of the other communication terminals are stored and collected into its own communication terminal.

According to the seventh invention, when the predetermined number of identifying information of the communication terminals are collected, a transmission via the first communication module is made, so that it is possible to easily determine when a communication via the first communication module is to be started.

An eighth invention is a network system according to the first invention, and each of the communication terminals further comprises a counting means for counting the number of pairing processing of storing and collecting the identifying information stored in the other communication terminal into its own communication terminal, and the second condition is that the count by the counting means reaches a predetermined number of times.

According to the eighth invention, when a predetermined number of pairing processing is executed, a transmission via the first communication module is made, so that it is possible to easily determine when a communication via the first communication module is to be started.

Here, the number of times that its own game apparatus becomes the master is counted, and if the result reaches a predetermined number of times, it can be determined that its own game apparatus becomes the only master. When a predetermined operation is performed by the user, it can be determined that its own game apparatus become the master.

A ninth invention is a network system according to the first invention, and the third condition is to store and collect the identifying information stored in its own communication terminal into the other communication terminal in the pairing processing.

According to the ninth invention, it is possible to easily decide which communication terminal makes reception over the first communication module.

A tenth invention is a network system according to the first invention, and each of the communication terminals further comprises a collecting-side-communication-terminal deciding means for deciding whether or not its own communication terminal becomes a communication terminal on a collecting side in a communication with any one of the other communication terminals, and the pairing means stores and collects the identifying information stored in the other communication terminal into its own communication terminal when the collecting-side-communication-terminal deciding means decides that its own communication terminal becomes the communication terminal on the collecting side.

According to the tenth invention, it is possible to make pairing after whether or not its own game apparatus becomes the collecting side is decided.

An eleventh invention is a network system according to the tenth invention, and the first condition is that the collecting-side-communication-terminal deciding means decides that its own communication terminal becomes the communication terminal on the collecting side.

According to the eleventh invention, the communication terminal which is decided to be the collecting side (master) performs a next pairing, so that it is possible to efficiently perform the pairing.

A twelfth invention is a network system according to the tenth invention, and the third condition is that the collecting-side-communication-terminal deciding means decides that its own communication terminal does not become the communication terminal on the collecting side.

According to the twelfth invention, it is possible to easily decide a communication module which receives over the first communication module (slave).

A thirteenth invention is a network system according to the first invention, and each of the communication terminals further comprises a master-and-slave deciding means for deciding whether its own communication terminal becomes a master or a slave in a communication with any one of the other communication terminals, the pairing means stores and collects the identifying information stored in the other communication terminal into its own communication terminal when its own communication terminal becomes the master by the master-and-slave deciding means, and stores and collects the identifying information stored in its own communication terminal into the other communication terminal when its own communication terminal becomes the slave by the master-and-slave deciding means.

According to the thirteenth invention, by deciding whether its own communication terminal becomes the master or the slave, it is possible to easily decide whether or not the collection is to be made.

A fourteenth invention is a network system according to the thirteenth invention, and each of the communication terminals further comprises a connection request transmitting means for transmitting a connection request to any one of the other communication terminals via the second communication module, a connection request receiving means for receiving the connection request from the other communication terminal via the second communication module, a connection response transmitting means for transmitting via the second communication module a connection response to the other communication terminal which has transmitted the connection request when the connection request is received and a connection response receiving means for receiving the connection response from the other communication terminal via the second communication module, and the master-and-slave deciding means decides that its own game apparatus becomes a master when it receives the connection request, and decides that its own game apparatus becomes a slave when it receives the connection response.

According to the fourteenth invention, in a case that its own communication terminal receives a connection request from other communication terminal, it becomes the master whereas in a case that a connection response is received from other communication terminal, it becomes the slave, so that it is possible to easily decide the master and the slave.

A fifteenth invention is a network system according to the first invention, and each of the communication terminals further comprises an identifying information transmitting means for transmitting the stored identifying information to the other communication terminal and an identifying information receiving means for receiving the identifying information stored in the other communication terminal, and the pairing means stores and collects the identifying information into its own game apparatus when the identifying information stored in the other communication terminal is received by the identifying information receiving means, and collects the identifying information into the other communication terminal when the identifying information is transmitted to the other communication terminal by the identifying information transmitting means, the first condition is that when the identifying information stored in the other communication terminal is received by the identifying information receiving means, and the third condition is that when the identifying information is transmitted to the other communication terminal by the identifying information transmitting means.

According to the fifteenth invention, it is possible to easily collect by transmission and reception of the identifying information.

A sixteenth invention is a network system according to the first invention, and an partner to be subjected to next pairing processing with the communication terminal for which the first condition has been satisfied in the pairing processing is the communication terminal for which the first condition has been satisfied in another pairing processing.

According to the sixteenth invention, it is possible to make the number of pairing processing less.

A seventeenth invention is a network system according to the first invention, and each of the communication terminals further comprises a memory storing self-identifying information, and the pairing means collects by additively writing the identifying information in order in the memory through a series of pairing processing.

According to the seventeenth invention, the identifying information is written additively in a collecting order, so that the information can be utilized.

Here, the order of the identifying information is referred in division to teams for a match-up game in a certain embodiment, but may be utilized as priority information as well.

An eighteenth invention is a network system according to the first invention, and each of the communication terminals further comprises a processing means for starting a wireless communication by the first communication module with reference to the identifying information sent or received by the signal transmitting and receiving means, and executing information processing by working its own game apparatus together with each of the other communication terminals.

According to the eighteenth invention, by transmitting and receiving the collected identifying information, a plurality of communication terminal can work together to execute information processing.

A nineteenth invention is a network system according to the seventeenth invention, and each of the communication terminals further comprises a dividing means for dividing the communication terminals into teams on the basis of the order of the identifying information stored in the memory in a case that the second condition is satisfied, and a processing means for starting a wireless communication by the first communication module after the transmission or the reception by the signal transmitting and receiving means, and executing game processing in such a manner as to divide the communication terminals into teams by utilizing a result of the dividing means to thereby battle between its own communication terminal and the other communication terminals.

According to the nineteenth invention, it is possible to perform division of the communication terminals into the teams on which the pairings are reflected.

A twentieth invention is a network system according to the first invention, and each of the communication terminals further comprises a self-identifying-information determining means for determining whether or not the self-identifying information is included in the signal when the signal is received by the signal transmitting and receiving means, and a processing means for starting a wireless communication with the other communication terminal for which the second condition is satisfied via the first communication module with reference to the signal, and executing information processing when the self-identifying-information determining means determines that the self-identifying information is included.

According to the twentieth invention, a communication over the first communication module is performed with only the connection partner specified by the second communication module, so that it is possible to be sure to make a connection only with the connection partner which collects the identifying information.

A twenty-first invention is a communication terminal storing at least self-identifying information, and comprises a first communication module for making a wireless communication with the plurality of other communication terminals with reference to each of the identifying information, a second communication module for making a communication with each of the communication terminals without reference to the identifying information, a pairing means for executing pairing processing of storing and collecting with any one of the communication terminals the identifying information stored in at least the one communication terminal into the other communication terminal via the second communication module prior to a start of a wireless communication by the first communication module, and repetitively executing the pairing processing of storing and collecting, with still another one of the communication terminals, the identifying information stored in at least the one communication terminal into the other communication terminal every time a first condition is satisfied in the pairing processing, and a signal transmitting and receiving means for transmitting a signal including all the identifying information to the other communication terminal via the first communication module in a case that a second condition is satisfied and receiving the signal transmitted from the other communication terminal via the first communication module when a third condition is satisfied, as a result of a series of the pairing processing by the pairing means.

A twenty-second invention is a storage medium storing a communication program, wherein the communication program causes a computer of a communication terminal storing at least its own identifying information and having a first communication module for making a wireless communication with the others of the communication terminals with reference to each of the identifying information and a second communication module for making a communication with each of the communication terminals without reference to the identifying information to function as a pairing means for executing pairing processing of storing and collecting with any one of the communication terminals the identifying information stored in at least the one communication terminal into the other communication terminal via the second communication module prior to a start of a wireless communication by the first communication module, and repetitively executing the pairing processing of storing and collecting, with still another one of the communication terminals, the identifying information stored in at least the one communication terminal into the other communication terminal every time a first condition is satisfied in the pairing processing, and a signal transmitting and receiving means for transmitting a signal including all the identifying information to the other communication terminal via the first communication module in a case that a second condition is satisfied and receiving the signal transmitted from the other communication terminal via the first communication module when a third condition is satisfied, as a result of a series of the pairing processing by the pairing means.

A twenty-third invention is a method of making a communication between four communication terminals each storing at least self-identifying information, and having a first communication module making a wireless communication between the four communication terminals with reference to each of the identifying and a second communication module making a communication between the two communication terminals without reference to the identifying information, wherein the arbitrary two communication terminals make a first pair and the other two the communication terminals make a second pair prior to a start of a wireless communication by the first communication module, first pairing processing is executed of collecting via the second communication module the identifying information stored in the one communication terminal into the other communication terminal between the two communication terminals being made up of the first pair, and second pairing processing is executed of storing and collecting via the second communication module the identifying information stored in the one communication terminal into the other communication terminal between the two communication terminals being made up of the second pair, the two communication terminals each of which collects the identifying information in the first and second pairing processing make a third pair, third pairing processing is executed of collecting via the second communication module the identifying information stored in the one communication terminal into the other communication terminal between the two communication terminals being made up of the third pair, and the communication terminal which collects the identifying information in the third pairing processing transmits a signal including all the collected identifying information via the first communication module whereas the other three communication terminals receives the signal transmitted from the communication terminal which collects the identifying information in the third pairing processing via the first communication module.

In the twenty-first, the twenty-second and the twenty-third inventions as well, similar to the first invention, even if each communication terminal stores the only self-identifying information, it is possible to easily and efficiently make a transition to the one-to-many wireless communication via the first communication module through the pairing among the plurality of communication partners via the second communication module.

A twenty-fourth invention is a network system being made up of three or more communication terminals each storing at least self-identifying information, wherein each of the communication terminals comprises a first communication module for making a wireless communication with the plurality of other communication terminals with reference to each of the identifying information, a second communication module for making a communication with each of the communication terminals without reference to the identifying information, an identifying information receiving means for repeating receiving processing of receiving and storing the identifying information stored in the other communication terminal in a case that a first condition is satisfied with any one of the communication terminal via the second communication module, and receiving and storing the identifying information stored in still another of the communication terminal every time the first condition is satisfied, and a signal transmitting means for transmitting a signal including all the received identifying information to the other communication terminal via the first communication module in a case that a second condition is satisfied as a result of a series of the receiving processing by the identifying information receiving means.

In the twenty-fourth invention as well, similar to the first invention, even if each communication terminal stores only the self-identifying information, it is possible to easily and efficiently make a transition to the one-to-many wireless communication over the first communication module through the pairing among the plurality of communication partners by the second communication module. It should be noted that the "first condition" in the first invention is that its own communication terminal becomes the master in the second round of the pairing processing onward, but the "first condition" in the twenty-fourth invention includes that its own communication module becomes the master in the first round of the pairing.

A twenty-fifth invention is a network system according to the twenty-fourth invention, and each of the communication terminals further comprises a connection request transmitting means for transmitting a connection request to the other communication terminal via the second communication module and a connection request receiving means for receiving the connection request from the other communication terminal via the second communication module, and the first condition is that the connection request is received.

According to the twenty-fifth invention, a next pairing is performed by the communication terminal on the receiving side of the connection request, so that it is possible to efficiently perform the pairings.

According to the present invention, implemented is a network system in which even if each of the three or more communication terminals stores only self-identifying information, it is possible to easily and efficiently make a one-to-many wireless communication. Furthermore, the communication terminals which participate in such a network system and the communication program for it are implemented.

The above described objects and other objects, features, aspects and advantages of the present invention will become more apparent from the following detailed description of the present invention when taken in conjunction with the accompanying drawings.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(A) shows one side surface in a close state, FIG. 3(B) shows a top surface in the close state, FIG. 3(C) shows the other side surface in the close state, and FIG. 3(D) shows a bottom surface in the close state;

FIG. 6 is an illustrative view showing one example of a network system in which four game apparatuses participate, FIG. 6(a) shows a case that a one-to-one infrared communication is made, and FIG. 6(b) shows a case that a one-to-many wireless communication is made;

FIG. 8 is an illustrative view showing one example of a pairing performed in a tournament system in a network system in which four game apparatuses participate (decision of a master machine and collection of the identifying information), FIG. 8(a) shows a tournament table, FIG. 8(b) shows a transition of an ID list every game apparatus, and FIG. 8(c) shows an ID list of the game apparatus which becomes the master machine and team information created based thereon;

FIG. 9(a) shows a screen at a time of a first pairing (first round), FIG. 9(b) and FIG. 9(c) shows display screens of the master side and the slave side in a next pairing (second round), and FIG. 9(d) shows a display screen at a completion of the pairing;

FIG. 17 is an illustrative view showing another example of a pairing performed in a tournament system in a network system in which five game apparatuses participate, FIG. 17(a) shows a tournament table, FIG. 17(b) shows a transition of an ID list every game apparatus, and FIG. 17(c) shows an ID list of the game apparatus which becomes the master machine and team information created based thereon; FIG. 18(a) shows a tournament table, and FIG. 18(b) shows an ID list of the game apparatus which becomes the master machine and team information created based thereon.

DETAILED DESCRIPTION OF THE PREFERRED EMBODIMENTS

Figure 1:
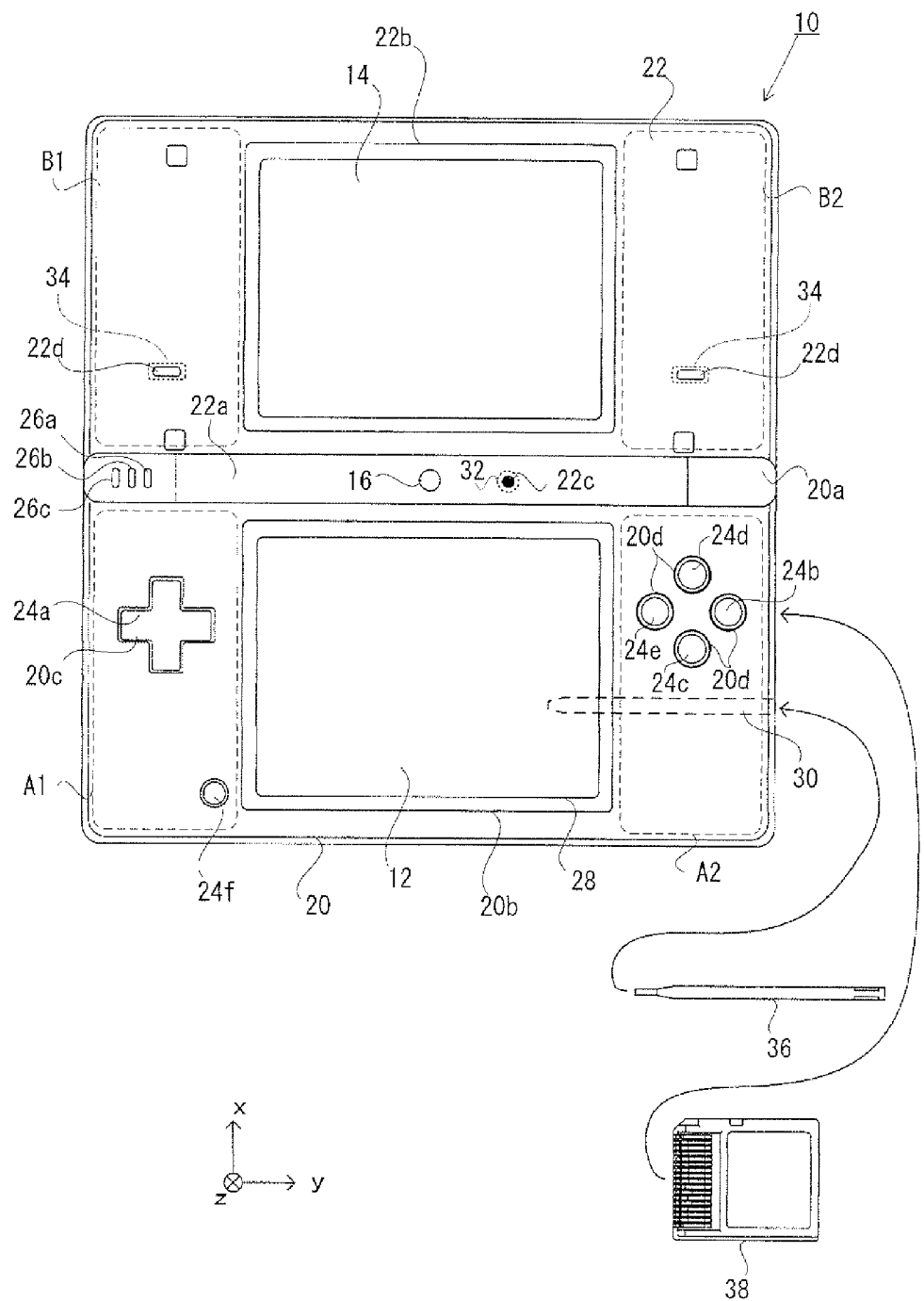
FIG. 1 is an external view of a game apparatus of one embodiment of the present invention showing a front surface in an open state.
Figure 2:
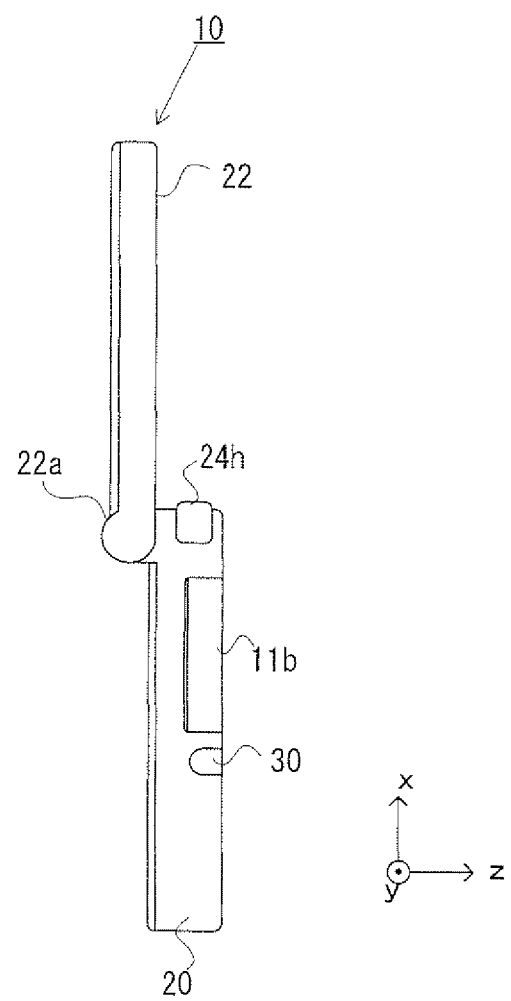
FIG. 2 is an external view of the game apparatus showing a side surface thereof in the open state.
Figure 3:
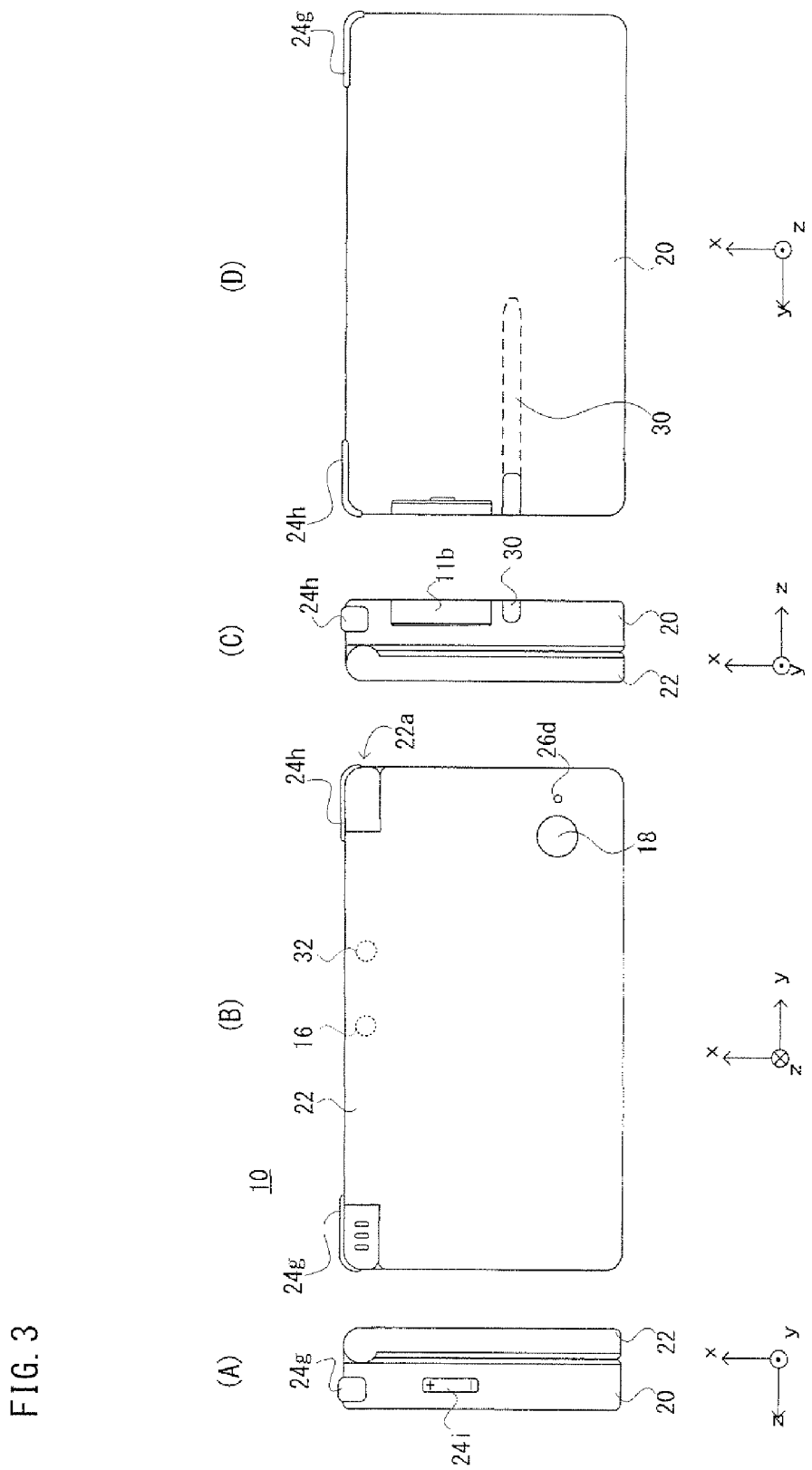
FIG. 3 is an external view of the game apparatus.

In FIG. 1-FIG. 3, an external view of a game apparatus 10 of one embodiment of the present invention is shown. The game apparatus 10 is a foldable game apparatus, and each of FIG. 1 and FIG. 2 shows the game apparatus 10 in a opened state (open state), and FIG. 3 shows the game apparatus 10 in a closed state (close state). Furthermore, FIG. 1 is a front view of the game apparatus 10 in the open state, and FIG. 2 is a side view of the game apparatus in the open state. The game apparatus 10 has two displays (LCDs 12 and 14) and two cameras (cameras 16 and 18), can image an image with the camera, display the imaged image and store the data of the imaged image.

The game apparatus 10 is constructed small enough to be held by the user with both of the hands or one hand even in the open state.

The game apparatus 10 has two housings of a lower housing 20 and an upper housing 22. The lower housing 20 and the upper housing 22 are connected with each other so as to be opened or closed (foldable). In this embodiment, the respective housings 20 and 22 are formed in the form of plate of a horizontally long rectangular, and are rotatably connected with each other at the long sides of both of the housings.

The upper housing 22 is supported pivotally at a part of the upper side of the lower housing 20. This makes the game apparatus 10 to take a close state (the angle formed by the lower housing 20 and the upper housing 22 is about 0° (see FIG. 3)) and an open state (the angle formed by the lower housing 20 and the upper housing 22 is about 180° (see FIG. 2)). The user generally uses the game apparatus 10 in the open state, and keeps the game apparatus 10 in the close state when not using the game apparatus 10. Furthermore, the game apparatus 10 can maintain the angle formed by the lower housing 20 and the upper housing 22 at an arbitrary angle between the close state and the open state by friction, etc. exerted on the hinge as well as the close state and the open state as described above. That is, the upper housing 12 can be fixed with respect to the lower housing 14 at an arbitrary angle.

First, the configuration of the lower housing 20 is first explained. As shown in FIG. 1, the game apparatus 10 has the lower LCD (liquid crystal display) 12. The lower LCD 12 takes a horizontally-long shape, and is arranged such that the direction of the long side is coincident with the long side of the lower housing 20. The lower LCD 12 is provided on an inner surface of the lower housing 20. Accordingly, if the game apparatus 10 is not to be used, the game apparatus 10 is in the close state to thereby prevent the screen of the lower LCD 12 from being soiled, damaged, and so forth. Additionally, in this embodiment, an LCD is used as a display, but other arbitrary displays, such as a display utilizing EL (Electro Luminescence), for example, may be used. Furthermore, the game apparatus 10 can employ a display of an arbitrary resolution. Additionally, in a case that the game apparatus 10 is used as an imaging device, the lower LCD 12 is used for displaying, in real time, images (through image) imaged by the camera 16 or 18.

The inner surface of the lower housing 20 is formed to be approximately planar. At the center of the inner surface, an opening 20b for exposing the lower LCD 12 is formed. At the left of the opening 20b (in the negative direction of the y axis in the drawing), an opening 20c is formed, and at the right of the opening 20b, an opening 20d is formed. The openings 20b and 20c are for exposing the respective keytops (the top surfaces of the respective buttons 24a-24e). Then, the screen of the lower LCD 12 provided inside the lower housing 20 is exposed from the opening 20b, and the respective keytops are exposed from the openings 20c and 20d. Thus, on the inner surface of the lower housing 20, on both sides of the opening 20b for the lower LCD 12 set at the center, non-screen areas (dotted line areas A1 and A2 shown in FIG. 1. More specifically, areas for arranging the respective buttons 24a-24e; button arranging area) are provided.

On the lower housing 20, the respective buttons 24a-24i and a touch panel 28 are provided as input devices. As shown in FIG. 1, the direction input button 24a, the button 24b, the button 24c, the button 24d, the button 24e, and the power button 24f out of the respective buttons 24a-24i are provided on the inner surface of the lower housing 20. The direction input button 24a is utilized for a selecting operation, for example, and the respective buttons 24b-24e are utilized for a decision operation and a cancel operation, for example. The power button 24f is utilized for turning on/off the power of the game apparatus 10. Here, the direction input button 24a and the power button 24f are provided on one side (left side in FIG. 1) of the lower LCD 12 provided at substantially the center of the lower housing 20, and the buttons 24b-24e are provided at the other side (right side in FIG. 1) of the lower LCD 12. The direction input button 24a and the buttons 24b-24e are utilized for performing various operations to the game apparatus 10.

FIG. 3(A) is a left side view of the game apparatus 10 in the close state, FIG. 3(B) is a front view of the game apparatus 10, FIG. 3(C) is a right side view of the game apparatus 10, and FIG. 3(D) is a rear view of the game apparatus 10. As shown in FIG. 3(A), the volume button 24i is provided on the left side surface of the lower housing 20. The volume button 24i is utilized for adjusting a volume of a speaker 34 furnished in the game apparatus 10. Furthermore, as shown in FIG. 3(D), the button 24h is provided at the right corner of the upper side surface of the lower housing 20. The button 24g is provided at the left corner of the upper side surface of the lower housing 20. The both of the buttons 24g and 24h are utilized for performing a imaging instructing operation (shutter operation) on the game apparatus 10, for example. Alternatively, both of the buttons 24g and 24h may be made to work as shutter buttons. In this case, a right-handed user can use the button 24h, and a left-handed user can use the button 24g, capable of improving usability for both of the users. Additionally, the game apparatus 10 can constantly make both of the buttons 24g and 24h valid as shutter buttons, or the game apparatus 10 is set to be a right-handed use or a left-handed use (the setting is input by the user according to a menu program, etc. and the set data is stored), and when the right-handed use is set, only the button 24h is made valid, and when the left-handed use is set, only the button 24g may be made valid.

As shown in FIG. 1, the game apparatus 10 is further provided with the touch panel 28 as an input device other than the respective operation buttons 24a-24i. The touch panel 28 is set to the screen of the lower LCD 12. In this embodiment, the touch panel 28 is a touch panel of a resistance film system. Here, the touch panel can employ arbitrary push type touch panels over the resistance film system. In this embodiment, as the touch panel 28, a touch panel having the same resolution (detection accuracy) as that of the lower LCD 12 is utilized. The resolution of the touch panel 28 and the resolution of the lower LCD 12 are not necessarily coincident with each other. Furthermore, at the right side surface of the lower housing 20, an inserting portion 30 (shown by a dotted line in FIG. 1 and FIG. 3(D)) is provided. The inserting portion 30 can accommodate a touch pen 36 utilized for performing an operation on the touch panel 28. It should be noted that an input to the touch panel 28 is generally performed by means of the touch pen 36, but can be performed on the touch panel 28 with fingers of the user besides the touch pen 36.

As shown in FIG. 2 and FIG. 3 (D), on the right side surface of the lower housing 20, an openable and closeable cover portion 11b is provided. Inside the cover portion 11b, a connector (not illustrated) for electrically connecting the game apparatus 10 and the memory card 38 is provided. The memory card 38 is detachably attached to a connector. The memory card 38 is used for storing a program operated in the game apparatus 10 or storing (saving) image data imaged by the game apparatus 10, for example.

As shown in FIG. 1, at the left of the shaft portion 20a of the lower housing 20, three LEDs 26a-26c are attached. Here, the game apparatus 10 can perform a wireless communication with another appliance, and the first LED 26a lights up when a wireless communication with the appliance is established. The second LED 26b lights up while the game apparatus 10 is recharged. The third LED 26c lights up when the main power supply of the game apparatus 10 is turned on. Accordingly, by the three LEDs 26a-26c, it is possible to inform the user of a communication-established state, a charge state, and a main power supply on/off state of the game apparatus 10.

Figure 4:
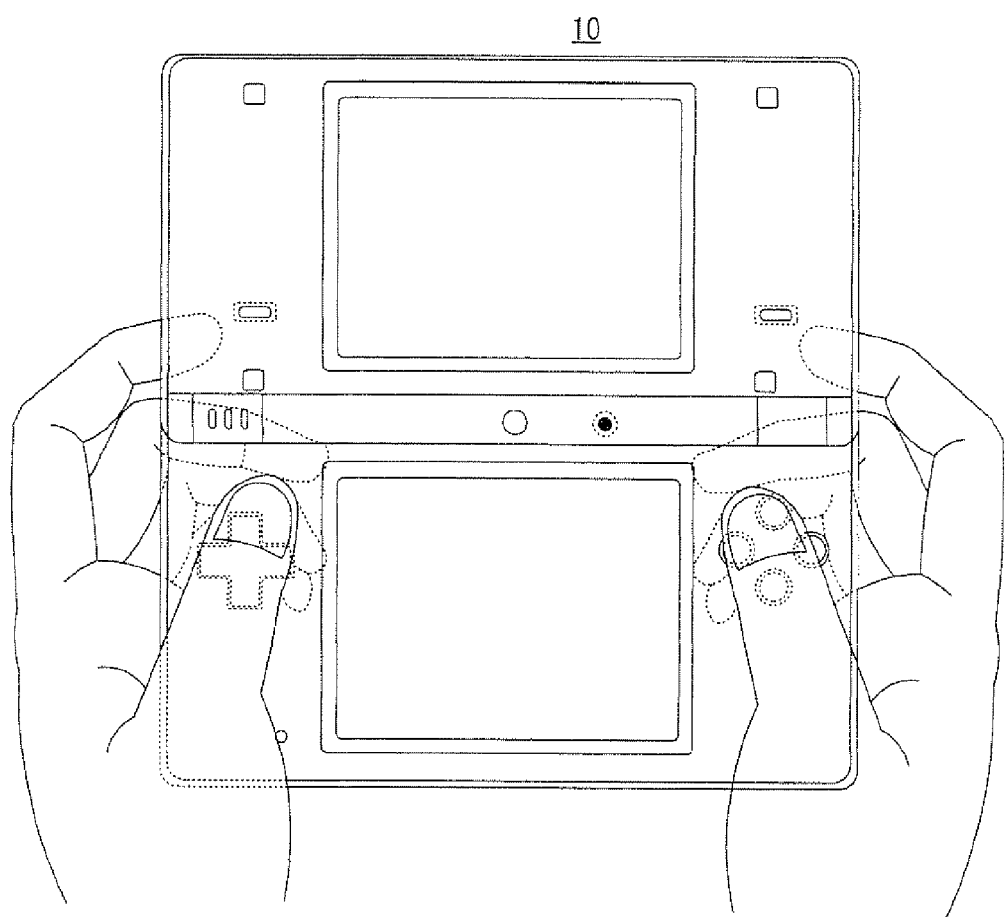
FIG. 4 is an illustrative view showing a state that the game apparatus is held by the user.

As described above, the lower housing 20 is provided with the input device (touch panel 28 and respective buttons 24a-24i) for performing an operation input to the game apparatus 10. Accordingly, when utilizing the game apparatus 10, the user can perform an operation on the game apparatus 10 while holding the lower housing 20. FIG. 4 shows a situation in which the user holds the game apparatus 10 with both of the hands. As shown in FIG. 4, the user holds the side surface and the outer surface (surface opposite to the inner surface) of the lower housing 20 with the palms, the middle fingers, the ring fingers and the little fingers of both of the hands in a state that the respective LCDs 12 and 14 are directed to the user. By holding the game apparatus 10 in such a manner, the user can perform operations as to the respective buttons 24a-24e with the thumbs, and perform operations as to the buttons 24g and 24h with the index fingers while holding the lower housing 20.

On the other hand, the upper housing 22 has a configuration for imaging an image (camera), and a configuration for displaying the imaged image (display). The configuration of the upper housing 22 is explained below.

As shown in FIG. 1, the game apparatus 10 has the upper LCD 14. The upper LCD 14 is set to the upper housing 22. The upper LCD 14 takes a horizontally-long shape, and is arranged such that the direction of the long side is coincident with the long side of the upper housing 22. The upper LCD 14 is provided on the inner surface of the upper housing 2 (the inner surface when the game apparatus 10 is in the close state). Accordingly, if the game apparatus 10 is not to be used, the game apparatus 10 is set to the close state to thereby prevent the screen of the upper LCD 14 from being soiled, damaged, and so forth. Here, similar to the lower LCD 12, in place of the upper LCD 14, a display with an arbitrary form and an arbitrary resolution may be utilized. It should be noted that in another embodiment, a touch panel may be provided on the upper LCD 14 as well.

Furthermore, the game apparatus 10 has the two cameras 16 and 18. The respective cameras 16 and 18 are housed in the upper housing 22. As shown in FIG. 1, the inward camera 16 is attached to the inner surface of the upper housing 22. On the other hand, as shown in FIG. 3(B), the outward camera 18 is attached to the surface being opposed to the surface to which the inward camera 16 is provided, that is, the outer surface of the upper housing 22 (outer surface when the game apparatus 10 is in the close state). Thus, the inward camera 16 can image a direction to which the inner surface of the upper housing 22 is turned, and the outward camera 18 can image a direction opposite to the imaging direction of the inward camera 16, that is, a direction to which the outer surface of the upper housing 22 is turned. As described above, in this embodiment, the two cameras 16 and 18 are provided so as to make the imaging directions opposite to each other. Accordingly, the user can image the two different directions without shifting the game apparatus 10 inside out. For example, the user can image a landscape as the user is seen from the game apparatus 10 with the inward camera 16, and can image a landscape as the direction opposite to the user is seen from the game apparatus 10 with the outward camera 18.

Furthermore, the inward camera 16 is attached to the center of the shaft portion 22a formed at the bottom of the upper housing 22. That is, the inward camera 16 is attached at the center of the part where the two housings 20 and 22 are connected. Accordingly, in a case that the game apparatus 10 is in the open state, the inward camera 16 is arranged between the two LCDs 12 and 14 (see FIG. 1). In other words, the inward camera 16 is positioned in the vicinity of the center of the game apparatus 10. Here, "the center of the game apparatus 10" means the center of the operation surface of the game apparatus 10 (surface being made up of the inner surfaces of the respective housings 20 and 22 in the open state). Here, it may be said that the inward camera 16 is arranged in the vicinity of the center in the horizontal direction of the LCDs 12 and 14. In this embodiment, when the game apparatus 10 is set to the open state, the inward camera 16 is arranged in the vicinity of the center of the game apparatus 10, and therefore, in a case that the user images the user himself or herself by the inward camera 16, the user may hold the game apparatus 10 at a position directly opposite to the game apparatus 10. That is, if the user holds the game apparatus at a normal holding position, the user is positioned at approximately the center of an imaging range, and the user himself or herself can easily be within the imaging range.

Furthermore, as shown in FIG. 3(B), the outward camera 18 is arranged at the upper end of the upper housing 22 (portion far away from the lower housing 20) in a case that the game apparatus 10 is set to the open state. Here, since the outward camera 18 is not for imaging the user holding the game apparatus 10, there is less need for being provided at the center of the game apparatus 10.

Furthermore, as shown in FIG. 1 or FIG. 3(B), a microphone 32 is housed in the upper housing 22. More specifically, the microphone 32 is attached to the shaft portion 22a of the upper housing 22. In this embodiment, the microphone 32 is attached around the inward camera 16 (next to the inward camera 16 along the y axis), and specifically attached next to the inward camera 16 in the positive direction of the y axis.

Furthermore, a through hole for microphone 22c is mounted to the shaft portion 22a at a position corresponding to the microphone 32 (next to the inward camera 16) such that the microphone 32 can detect a sound outside the game apparatus 10. Alternatively, the microphone 32 may be housed in the lower housing 20. For example, the through hole for microphone 22e is provided on the inner surface of the lower housing 20, specifically, at the lower left (button arranging area A1) of the inner surface of the lower housing 20, and the microphone 32 may be arranged in the vicinity of the through hole for microphone 22c within the lower housing 20.

Furthermore, the microphone 32 is attached in such a direction that its sound collecting direction (direction in which the sensitivity becomes maximum) is approximately in parallel with the imaging direction (optical axis) of the inward camera 16 (in other words, the sound collecting direction and the imaging direction are approximately in parallel with the z axis). Thus, a sound generated within the imaging range of the inward camera 16 is suitably acquired by the microphone 32. That is, detection of a sound input through the microphone 32 and detection of the user by the imaged image by the inward camera can be simultaneously performed, and accuracy of the detections can be improved, at the same time.

As shown in FIG. 3(B), on the outer surface of the upper housing 22, a fourth LED 26d is attached. The fourth LED 26d is attached around the outward camera 18 (at the right side of the outward camera 18 in this embodiment). The fourth LED 26d lights up at a time when an imaging is made with the inward camera 16 or the outward camera 18 (shutter button is pushed). Furthermore, the fourth LED 38 continues to light up while a motion image is imaged by the inward camera 16 or the outward camera 18. By making the fourth LED 26d light up, it is possible to inform an object to be imaged that an imaging with the game apparatus 10 is made (is being made).

Furthermore, the inner surface of the lower housing 22 is formed to be approximately planar. As shown in FIG. 1, at the center of the inner surface, an opening 22b for exposing the upper LCD 14 is formed. The screen of the upper LCD 14 housed inside the upper housing 22 is exposed from the opening 22b. Furthermore, on both side of the aforementioned opening 22b, a sound release hole 22d is formed one by one. Inside the sound release hole 22d of the upper housing 22, a speaker 34 is hosed. The sound release hole 22d is a through hole for releasing a sound from the speaker 34.

Thus, on the inner surface of the upper housing 22, non-display areas (areas B1 and B2 represented by a dotted lines in FIG. 1. More specifically, areas for arranging the speaker 34; speaker arranging areas) are provided on both sides of the opening 21B set at the center of the upper LCD 14. The two sound release holes 22d are arranged at approximately the center of the horizontal direction of each speaker arranging area with respect to the horizontal direction, and at the lower portion of each speaker arranging area with respect to the vertical direction (area close to the lower housing 20).

Here, as described above, by providing the non-display areas on the lower housing 20 and the upper housing 22 at the same positions in the horizontal direction, the game apparatus 10 is configured to help user's holding not only when it is held horizontally as shown in FIG. 4, but also when it is held vertically (a state rotated to left or right by 90° from the state shown in FIG. 4).

As described above, the upper housing 22 is provided with the cameras 16 and 18 which are configured to image an image and the upper LCD 14 as a display means for mainly displaying the imaged image. On the other hand, the lower housing 20 is provided with the input device (touch panel 28 and respective buttons 24a-24i) for performing an operation input to the game apparatus 10. Accordingly, when utilizing the game apparatus 10 as an imaging device, the user can perform an input to the input device with the lower housing 20 holding while viewing the imaged image (image imaged by the camera) displayed on the upper LCD 14.

Furthermore, in the vicinity of the camera 16 of the upper housing 22, the microphone 32 configured to input a sound is provided, and the game apparatus 10 can also be used as a recording device. In addition, the user performs a sound input over the microphone 32, and the game apparatus 10 can execute the game processing and application processing other than the game on the basis of the microphone input information as well.

Figure 5:
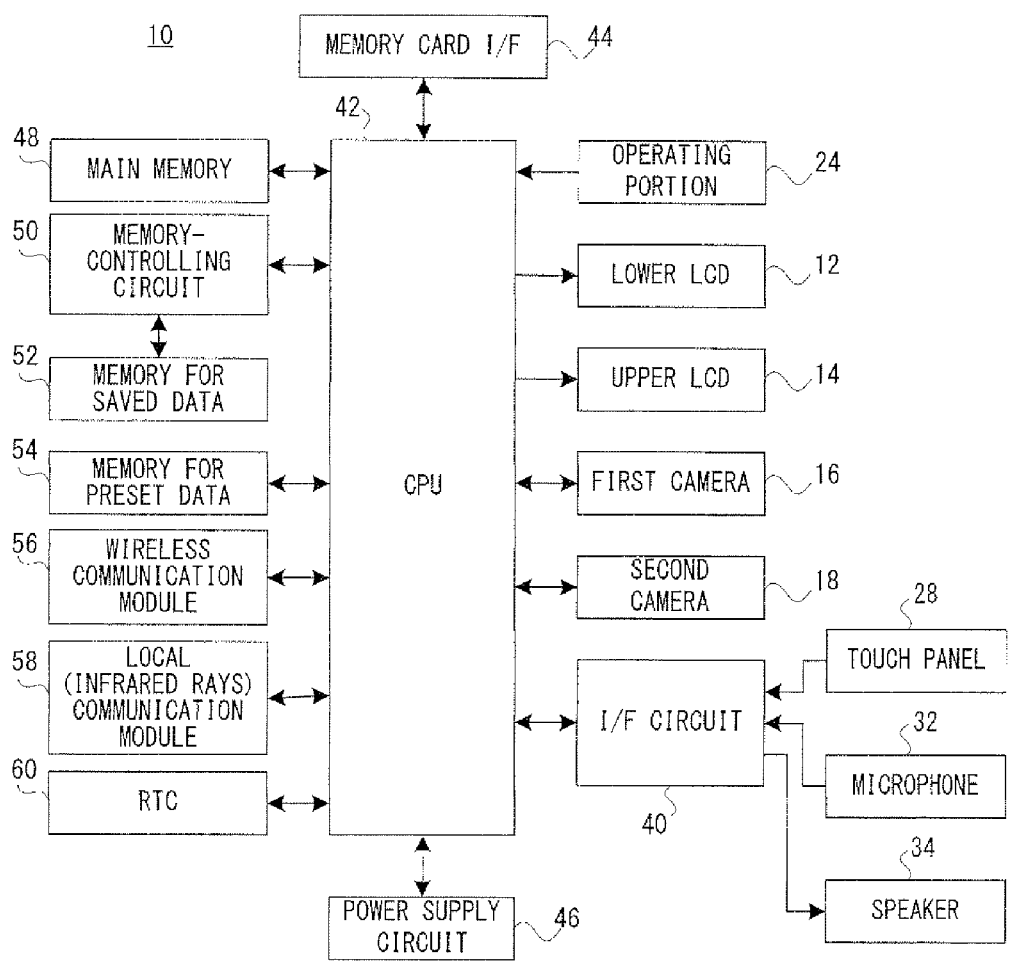
FIG. 5 is a block diagram showing one example of an electric configuration of the game apparatus.

FIG. 5 is a block diagram showing an internal configuration (electronic configuration) of the game apparatus 10. As shown in FIG. 5, the game apparatus 10 includes electronic components, such as a CPU 42, a main memory 48, a memory controlling circuit 50, a memory for saved data 52, a memory for preset data 54, a memory card interface (memory card I/F) 44, a wireless communication module 56, a local communication module 58, a real-time clock (RTC) 60, a power supply circuit 46, and an interface circuit (I/F circuit) 40, etc. Theses electronic components are mounted on an electronic circuit board, and housed in the lower housing 20 (or the upper housing 22 may also be appropriate).

The CPU 42 is an information processing means to execute various programs. In a case that the game apparatus 10 is utilized as an imaging device, the program for it is stored in the memory (memory for saved data 52, for example) within the game apparatus 10. The CPU 42 executes the program to allow the game apparatus 10 to function as an imaging device. Here, the programs to be executed by the CPU 42 may previously be stored in the memory within the game apparatus 10, may be acquired from the memory card 38, and may be acquired from another appliance by communicating with this another appliance.

The CPU 42 is connected with the main memory 48, the memory controlling circuit 50, and the memory for preset data 54. Furthermore, the memory controlling circuit 50 is connected with the memory for saved data 52. The main memory 48 is a memory means to be utilized as a work area and a buffer area of the CPU 42. That is, the main memory 48 stores various data to be utilized in the game processing and the application processing, and stores a program obtained from the outside (memory cards 38, another appliance, etc.). In this embodiment, a PSRAM (Pseudo-SRAM) is used, for example, as a main memory 48. The memory for saved data 52 is a memory means for storing (saving) a program to be executed by the CPU 42, data of an image imaged by the respective cameras 16 and 18, etc. The memory for saved data 52 is configured by a NAND type flash memory, for example. The memory controlling circuit 50 is a circuit for controlling reading and writing from and to the memory for saved data 52 according to an instruction from the CPU 42. The memory for preset data 54 is a memory means for storing data (preset data), such as various parameters, etc. which are previously set in the game apparatus 10. As a memory for preset data 54, a flash memory to be connected to the CPU 42 through an SPI (Serial Peripheral Interface) bus can be used.

The memory card I/F 44 is connected to the CPU 42. The memory card I/F 44 performs reading and writing data from and to the memory card 38 attached to the connector according to an instruction from the CPU 42. In this embodiment, the image data imaged by the respective cameras 16 and 18 is written to the memory card 38, and the image data stored in the memory card 38 is read from the memory card 38 and stored in the memory for saved data 52.

The wireless communication module 56 has a function of making a wireless LAN communication among a plurality of game apparatuses 10 of the same type in which one master machine and a plurality of slave machines are set according to an original protocol on IEEE802.11 standards, for example. Furthermore, the local communication module 58 has a function of performing a wireless communication with the same types of the game apparatuses by a predetermined communication system, such as an infrared communication. The wireless communication module 56 and local communication module 58 are connected to the CPU 42. The CPU 42 can send and receive data over the Internet with other appliances by means of the wireless communication module 56, and can send and receive data with the same types of other game apparatuses by means of the local communication module 58.

The local communication module 58 is contained in the game apparatus 10, but may be provided to the memory card 38, for example, without being provided to the game apparatus 10 and can perform a control of the communication via the memory card I/F 44.

Additionally, the CPU 42 is connected with the RTC 60 and the power supply circuit 46. The RTC 60 counts a time to output the same to the CPU 42. The CPU 42 can calculate a current time (date) on the basis of the time counted by the RTC 60, and detects an operation timing as to when an image is to be acquired, etc. The power supply circuit 46 controls power supplied from the power supply (a battery accommodated in the lower housing) included in the game apparatus 10, and supplies the power to the respective circuit components within the game apparatus 10.

Moreover, the game apparatus 10 is provided with the microphone 32 and the speaker 34. The microphone 32 and the speaker 34 are connected to the I/F circuit 40. The microphone 32 detects a sound of the user and outputs a sound signal to the I/F circuit 40. The speaker 34 outputs a sound corresponding to the sound signal from the I/F circuit 40. The I/F circuit 40 is connected to the CPU 42. Furthermore, the touch panel 28 is connected to the I/F circuit 40. The I/F circuit 40 includes a sound controlling circuit for controlling the microphone 32 and the speaker 34, and a touch panel controlling circuit for controlling the touch panel 28. The sound controlling circuit performs an A/D conversion and a D/A conversion on a sound signal, or converts a sound signal into audio data in a predetermined format. The converted audio data is written to a sound area (not shown) of the main memory 48. If the game apparatus 10 is utilized as a recording device, the audio data stored in the sound area is written to the memory for saved data 52 via the memory controlling circuit 50 thereafter (recorded in the memory card 38 via the memory card I/F 44 as required). Furthermore, the audio data (microphone input information) stored in the sound area 80 is also utilized for various game processing. The touch panel controlling circuit performs reading a signal from the touch panel 28 and generating touch position data every predetermined time period. The touch position data indicates coordinates of a position where an input is performed on an input surface of the touch panel 28. Also, the touch panel controlling circuit performs reading of a signal from the touch panel 28 and generation of the touch position data per each predetermined time. The CPU 42 acquires the touch position data to thereby know the position where the input is made on the touch panel 28.

The operating portion 24 is made up of the aforementioned respective buttons 24a-24i, and connected to the CPU 42. The operation data indicating an input state (whether or not to be pushed) with respect to each of the operation buttons 24a-24k is output from the operation button 24 to the CPU 42. The CPU 42 executes processing according to an input to the operating portion 24 by acquiring the operation data from the operating portion 24.

The respective cameras 16 and 18 are connected to the CPU 42. The respective cameras 16 and 18 image images according to an instruction from the CPU 42, and output imaged image data to the CPU 42. The CPU 42 writes the image data from each of the cameras 16 and 18 to an image area (not shown) of the main memory 48. In a case that the game apparatus 10 is utilized as an imaging device, the image data stored in the image area is written to the memory for saved data 52 via the memory controlling circuit 50 (and moreover recorded in the memory card 38 via the memory card I/F 44 as required). Furthermore, the image data sorted in the image area can also be utilized for various game processing.

In addition, each of the LCDs 12 and 14 is connected to the CPU 42. Each of the LCDs 12 and 14 displays an image according to an instruction by the CPU 42. In a case that the game apparatus 10 is utilized as an imaging device, the CPU 42 displays an image acquired from any one of the cameras 16 and 18 on the upper LCD 14, and displays an operation screen generated according to predetermined processing on the lower LCD 12. If a game is played with the game apparatus 10, a game image is displayed on one or both of the LCD 12 and 14.

The game apparatus 10 configured as described consists of a network system 100 by working together with a plurality of other game apparatuses 10 each being configured similarly when playing a match-up game. Three or more game apparatuses 10 which participate in the network system 100 perform pairings over a one-to-one (described later) infrared communication (see FIG. 6(a)), make a transition to a one-to-many wireless communication (see FIG. 6(b)) to play a match-up game by being divided into two or more teams. Alternatively, without being divided into teams, the game apparatuses 10 may play a match-up game by an individual match. Here, the plurality of game apparatuses 10 have to be distinguished from one another, they are denoted by game apparatuses 10(A), 10(B), 10(C) . . . . Under certain circumstances, they may be denoted by a master machine A, a slave machine B, a slave machine C or may be abbreviated as A, B, C, . . . .

In what follows, the network system 100 and an operation of each of the game apparatuses 10 which participates in the system are explained in detail, but the general outlines of thereof is explained first. Referring to FIG. 6(a) and FIG. 6(b), infrared communications have a property of having a strong (high) directivity and a short coverage area whereas wireless communications have a property of having a weak (low) directivity and a long coverage area. On the other hand, from these properties and communication standards, the infrared communication can be performed without identifying information to identifying each game apparatus 10(A), 10(B) . . . whereas the wireless communications has a limitation in that it cannot be performed without such identifying information.

Here, the identifying information is typically an MAC address, an IP address, etc., but it may be information defined according to an original rule if the information is the information capable of uniquely specifying each game apparatus 10. A user name, a nickname, etc. may be included in the identifying information.

Thereupon, in the network system 100, a communication method of first performing pairing via the one-to-one infrared communications and being followed by the one-to-many wireless communications is adopted. More specifically, the plurality of game apparatuses 10 which participate in the network system 100 first are divided into arbitrary pairs of game apparatuses, and for each pair, a master and a slave are decided through the one-to-one infrared communications as shown in FIG. 6(a), and the master and the slave notify the identifying information with each other. Such processing is equal to the "pairing" in this embodiment.

Furthermore, when performing the pairing, each game apparatus 10 writes the identifying information notified from the partner after its own identifying information. Accordingly, at a time of completion of the pairing, in the main memory 48 (identifying information (ID list) area 82: see FIG. 10) of the game apparatus 10 which becomes a master, identifying information (B, C . . . , for example) of the game apparatus 10 which becomes a slave is stored after the self-identifying information (A, for example). The game apparatus 10 which becomes a slave also stores the identifying information of the game apparatus 10 which becomes a master after the self-identifying information.

Next, the game apparatuses 10 which become masters pair with each other again to similarly decide a master and a slave, and they exchange the identifying information between the master and the slave. At this time, the game apparatuses 10 exchange other identifying information additively written after the self-identifying information with each other. Such processing is repeated until one master game apparatus 10 remains, and this last game apparatus 10 is decided as a master machine, and the rest of it are decided as slave machines. In brief, pairings are performed among the plurality of game apparatuses 10 in the tournament system until one master machine is decided, and in the course of the process, identifying information of respective slave machines are collected in the master machine. Accordingly, the game apparatus 10 which becomes a master machine through the tournament system consequently stores identifying information (A, B, C . . . ) about all the game apparatuses 10.

Additionally, in this embodiment, during the pairing, the identifying information is notified between the master and the slave, but the notification from the master to the slave is not necessarily performed. This is because if the identifying information is notified at least from the slave to the master, all the identifying information is collected to the master machine. In this case, the decision of the master and the slave can be defined as a decision whether a collecting side or not (side of receiving a notification of the identifying information from the partner or a side of notifying the identifying information to the partner).

Furthermore, the number of game apparatuses which participate in the network system 100 is preferably a power of 2, such as 4 game apparatuses (see FIG. 8(a)), 8 game apparatuses (see FIG. 18(a)), etc. by the above-described nature of the tournament. Here, the number except for the power of 2, such as 5 game apparatuses (see FIG. 17(a)) may be appropriate. If five apparatuses participate, one of them may participate in the second round (seed system).

In addition, the seed system may be adopted irrespective of the number of participating game apparatuses. Although illustration is omitted, when the seed system is adopted in a case the four game apparatuses (A to D) participate, the A and the B are paired (first round), the one which becomes a master, for example, the A is then paired with C (second round), and then, the one which becomes a master, for example, the C is paired with D (third round). The number of pairings to be executed in this case is three times, that is, the times the same as that when the seed system is not adopted (see FIG. 8(a)), but for the game apparatus 10 which finally becomes the master machine, pairing is performed at up to three times in a case that the seed system is adopted whereas it needs only two times pairings in a case that the seed system is not adopted.

Generally, irrespective of the tournament table, if the number of participating apparatuses is N, (N−1) pairings are performed until the master machine is decided.

Here, in another embodiment, the identifying information may be exchanged in a round robin system. In the round robin system, when the number of participating apparatuses is N, the number of pairings required for notifying the identifying information among all the game apparatuses 10 becomes $NC2 = N \cdot (N-1)/(2 \cdot 1)$. Accordingly, if $N \geq 3$, it makes possible for the tournament system to make a transition to the wireless communication through the number of pairings less than that in the round robin system.

Next, the game apparatus 10 which becomes a master machine broadcasts a signal (a so-called beacon) including the identifying information (A, B, C . . . ) possessed by its own apparatus through the one-to-many wireless communication as shown in FIG. 6(b). Each game apparatus 10 which becomes a slave machine receives the signal thus broadcasted (detects the beacon including the self-identifying information) to thereby acquire the identifying information (A, B, C . . . ) in relation to all the game apparatuses 10 from the master machine.

Here, since the game apparatus 10 which becomes a master machine (only master) stores the identifying information of all the communication terminals, and the game apparatus 10 which becomes a slave stores at least the self-identifying information, for transmission and reception of the signal, a multicast system designating a plurality of destinations may be used, or a unicast system designating a single destination may be individually used, as well as a broadcast system which does not designate a destination.

Since the identifying information (see FIG. 8(b), FIG. 17(b)) thus collected to the master machine are acquired by additionally writing, after the self-identifying information, the identifying information obtained from the paired partner by the game apparatus 10 which becomes a master machine in the process of advancing to the final round one after another, depending on which order the identifying information of the respective game apparatuses 10 are stored, the log of the pairings performed in the tournament can be found. Thereupon, the game apparatus 10 which becomes a master machine performs a division into the teams based on the pairings according to the storing order of the possessed identifying information (see FIG. 8(c), FIG. 17(c)). The team information thus obtained is notified to each slave machine by being transmitted so as to be included in a beacon together with identifying information. In the master machine and each slave machine, game processing, such as summing up points is performed on the basis of the team information.

It should be noted that in place of the additively writing manner as described above, a manner in which information indicating a storing order of the identifying information, such as time information and information on the number of pairings, etc. is separately created, and the time information or the number of pairings information is stored together with the identifying information can be used. In this case, the identifying information may be stored in random positions.

Furthermore, the team information may be transmitted at an appropriate timing separately from the identifying information (without being included in the beacon). Alternatively, the team information may be utilized in only the master machine without being notified to the slave machine.

Figure 7:
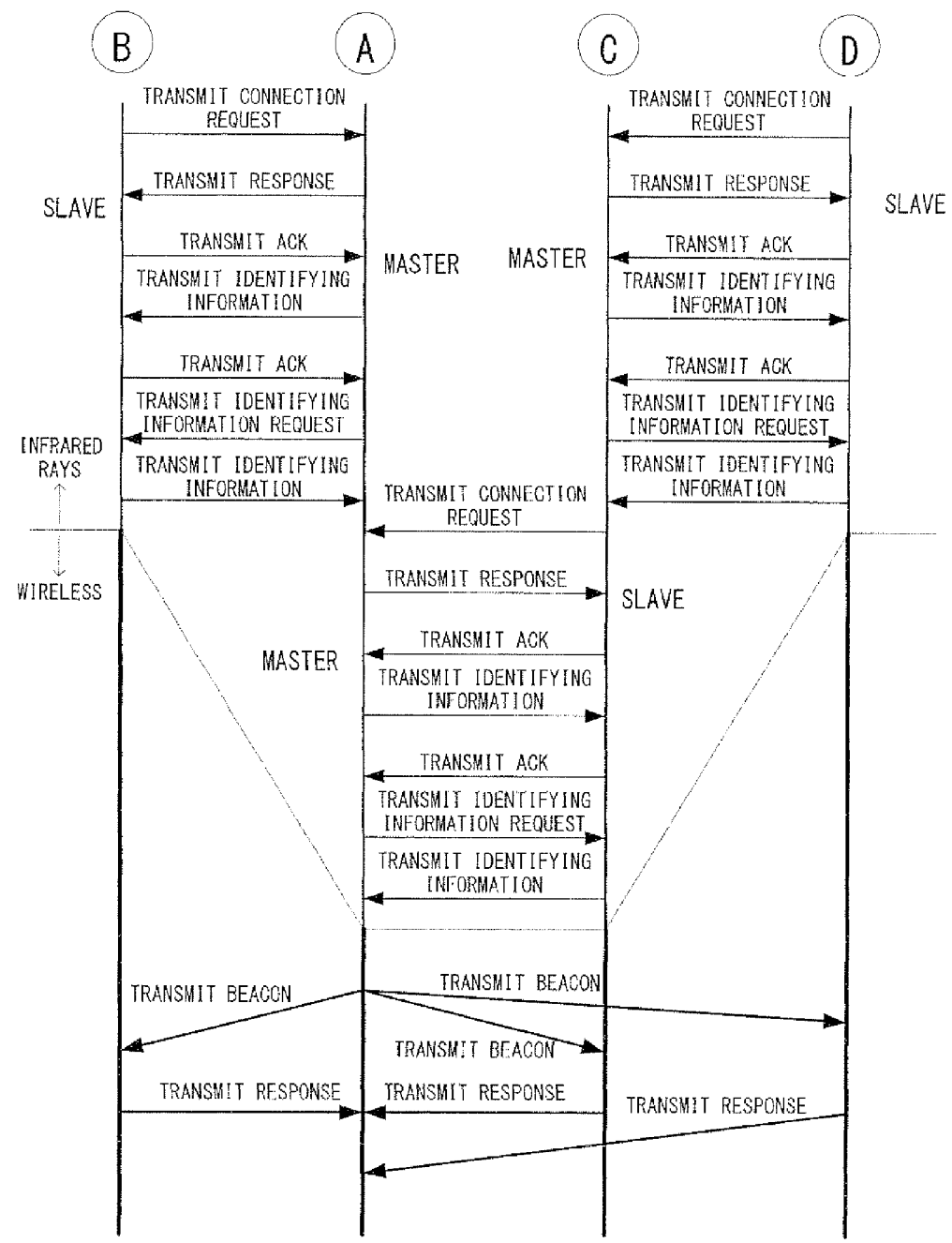
FIG. 7 is a sequence diagram showing procedures of communications made by infrared rays and wirelessly in a network system in which four game apparatuses participate.
Figure 9:
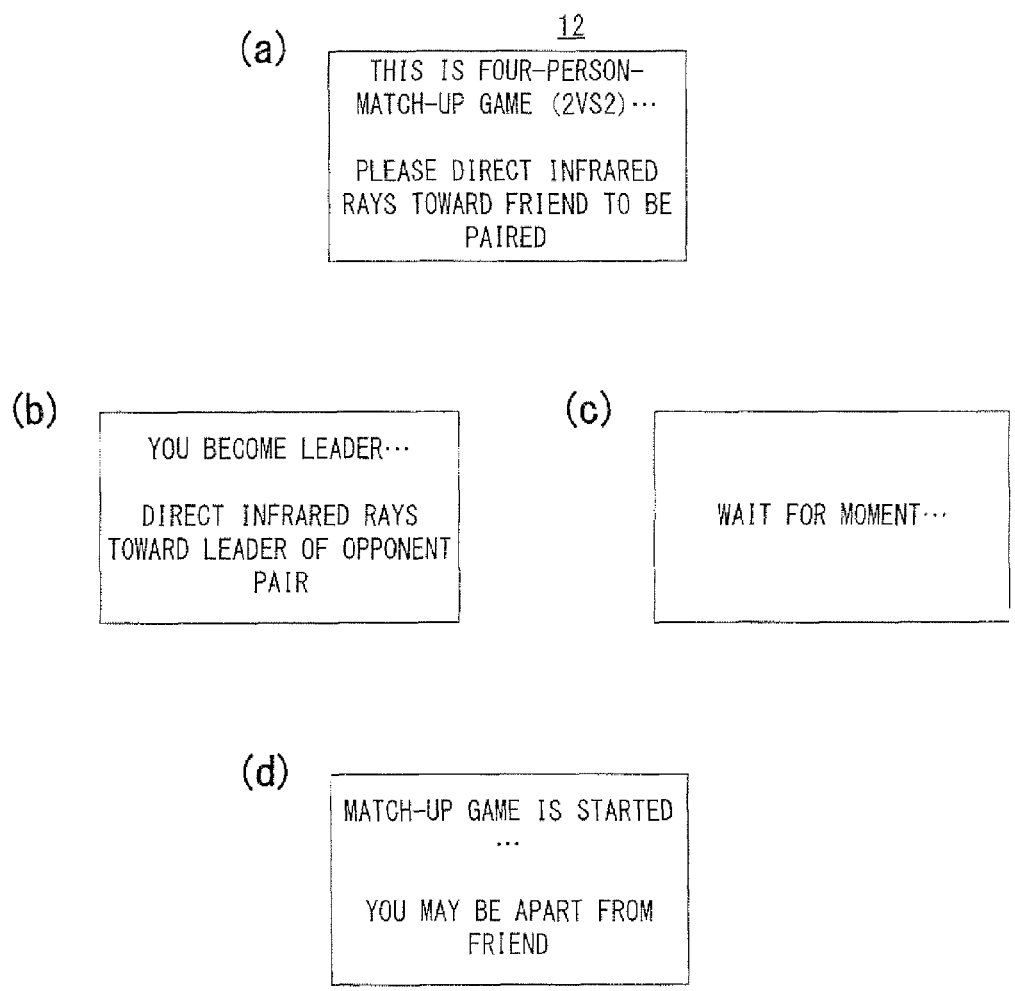
FIG. 9 is an illustrative view showing a transition of the screen to be displayed on the lower LCD.

Next, a concrete operating example is explained. First, a case that four (=22) game apparatuses participate (no seed) is explained with reference to FIG. 7-FIG. 9. FIG. 7 shows one example of a communication sequence, FIG. 8 shows one example of pairings in the tournament system, transitions of the ID lists and a division into teams, and FIG. 9 shows one example of a screen display updated as the tournament advances, with respect to a case that the four game apparatuses participate.

As described before, the partner to be paired can be decided on the side of the user, and on the lower LCD 12 of each game apparatus 10 (A-D), a screen shown in FIG. 9(a) is displayed. Here, on the upper LCD 14, an image representing a conception of infrared rays (not illustrated), a scene in which two game apparatuses are close to each other to perform a infrared communication (see FIG. 6(a)), or the like are displayed.

Assuming that two game apparatuses 10(A) and 10(B) are face to face with each other to be paired while other two game apparatuses 10(C) and 10(D) are paired. When the respective pairs are decided, communications over the infrared rays are started, and the one game apparatus makes a connection request to the other game apparatus. Here, in a case that both of the game apparatuses make connection requests, priority is given to the connection request which is first performed, and as to the connection requests which are simultaneously performed, any one of them is selected.

Referring to FIG. 7, with respect to the pair between the A and the B, the game apparatus 10(B) transmits a connection request, and the game apparatus 10(A) receiving it transmits a response. The game apparatus 10(B) becomes a slave at a time when it receives the response from the game apparatus 10(A), and transmits an ACK (ACKnowledgement). The game apparatus 10(A) becomes a master at a time it receives the ACK from the game apparatus 10(B), and transmits the identifying information possessed by its own apparatus (only the A's self-identifying information at this point).

The game apparatus 10(B) receives the identifying information thus transmitted from the game apparatus 10(A), additively writes the received identifying information after the identifying information possessed by its own apparatus (only the B self-identifying information at this point), and then transmits an ACK. The game apparatus 10(A) receiving the ACK transmits an identifying information request, and the game apparatus 10(B) receiving it transmits the identifying information possessed by its own apparatus (B's and A's identifying information at this point). Here, when the identifying information is thus transmitted, the identifying information received from the partner (A) may be excluded (the same is true hereunder).

The game apparatus 10(A) receives identifying information thus transmitted from the game apparatus 10(B), and additively writes the received identifying information after the identifying information possessed by its own apparatus (only the A's self-identifying information at this point). However, in a case that there is identifying information which has been possessed by the game apparatus 10(A) before reception, such identifying information (A's self-identifying information has been possessed before the reception) may not be additively written. Through the above-described processing, a pairing between the A and the B is established. With respect to the pair between the C and the D, communications as described above are made, and the C becomes a master, and the D becomes a slave, for example, and they notify the identifying information to each other.

When the pairings (A, B) and (C, D) are thus established, a first round is ended in the tournament table shown in FIG. 8(a), and the A and the C which become the master advance to the pairing at a second round. That is, the screens of the A and the C which becomes the masters at a time of establishment of the pairing are updated as shown in FIG. 9(b), and according to the prompt of the screen, the A and the C are close to and face to face with each other. Then, infrared communications are made between the A and the C similar to the above description, the A becomes a master, the C becomes a slave, for example, and they notify the identifying information to each other. On the other hand, the screens of the B and the D which become the slaves through the pairing at the first round are updated as shown in FIG. 9(c), and the B and the D are waited according to the prompt of the screen.

When the pairing (A, C) is thus established, the second round is ended in the tournament table shown in FIG. 8(a). The A which is the only master at this point becomes the master machine and the B-D which are slaves become slave machines. Here, the screen of the C is updated as shown in FIG. 9(c) similar to the B and the D. Furthermore, the screen of the A which becomes the only master is also updated as shown in FIG. 9(c).

Furthermore, as the tournament advances, the identifying information (ID list) possessed by the A-D make a transition as shown in FIG. 8(b). That is, in each of the ID lists of the A to D, in the initial state, self-identifying information, that is, only the "A", the "B", the "C", or the "D" is stored. After the first round, identifying information of the partner to be paired is additively written after the self-identifying information, so that each of the identifying information makes transitions to "A, B", "B, A", "C, D", and "D, C". After the second round, the ID lists of the A and the C are further changed as shown in "A, B, C, D", and "C, D, A, B", respectively. Here, if only the notification from the slave to the master is performed, the ID lists of the B and the D are left in the initial state, and the ID list of the C is in a state after the first round, that is, maintains the "C, D".

Additionally, in FIG. 8(b), FIG. 17(b), and FIG. 18(a), numerals 1, 2, . . . are given to the respective slave machines, but this numerals show a describing order (chronologically) in the ID list of the master machine, and can be used as priority information, for example, in the later game processing.

Then, from the ID list of the A as a master machine, that is, from the "A, B, C, D", team information, that is, "(A, B)/(C, D)" shown in FIG. 8(c) is created. The team information can be obtained by dividing the "A, B, C, D" to half, that is, the first half and the second half, and corresponds to the pairings in the first round of the tournament.

Returning to FIG. 7, the A which becomes a master machine broadcasts a beacon including the ID list possessed by it own machine, that is, "A, B, C, D" and the team information"(A, B)/(C, D)". The B to D which become slave machines can acquire the identifying information and the team information which are required to perform a match-up game among the A to D through the one-to-many wireless communication by detecting the beacon including the self-identifying information thus broadcasted from the master machine. The ID lists possessed by the B to D are overwritten with the ID list received from the A. At this point, the screens of the A to D are updated to the screen shown in FIG. 9(d).

Here, on the screen shown in FIG. 9(d), the identifying information and the team information of the A to the D may be displayed. The identifying information to be displayed here is preferably a user name, a nickname, etc. Furthermore, on the upper LCD 14, an image representing a conception of the wireless communication (not illustrated), or a scene in which four game apparatuses make wireless communications far from one another (see FIG. 6(b)) is displayed.

From each of the B to D receiving the beacon, a response is transmitted to the A. The match-up game (A, B) team versus (C, D) team is started after the A receives the responses from B to D. In the match-up game, the score is sum up on the basis of the team information for each team, and a winning team or a team standing is decided by scores.

Figure 10:
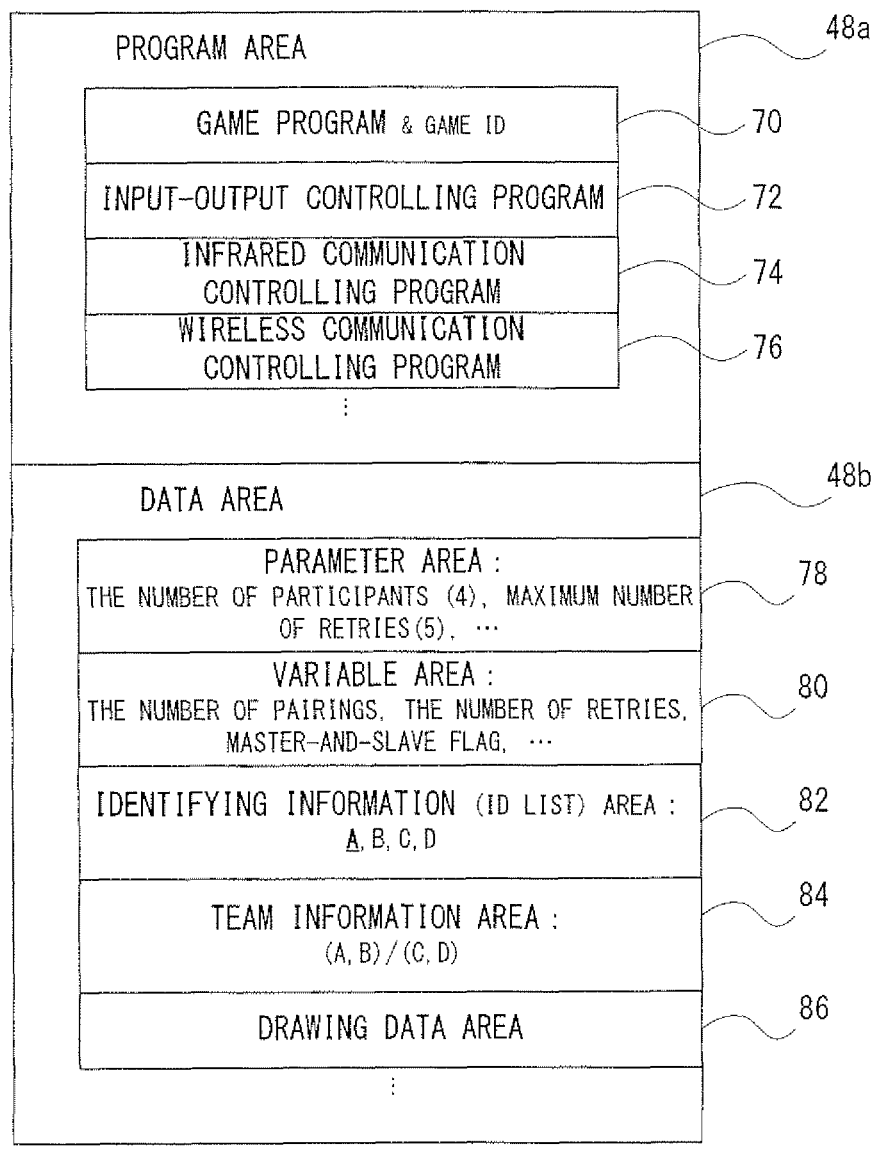
FIG. 10 is an illustrative view showing a part of a memory map of a main memory.
Figure 11:
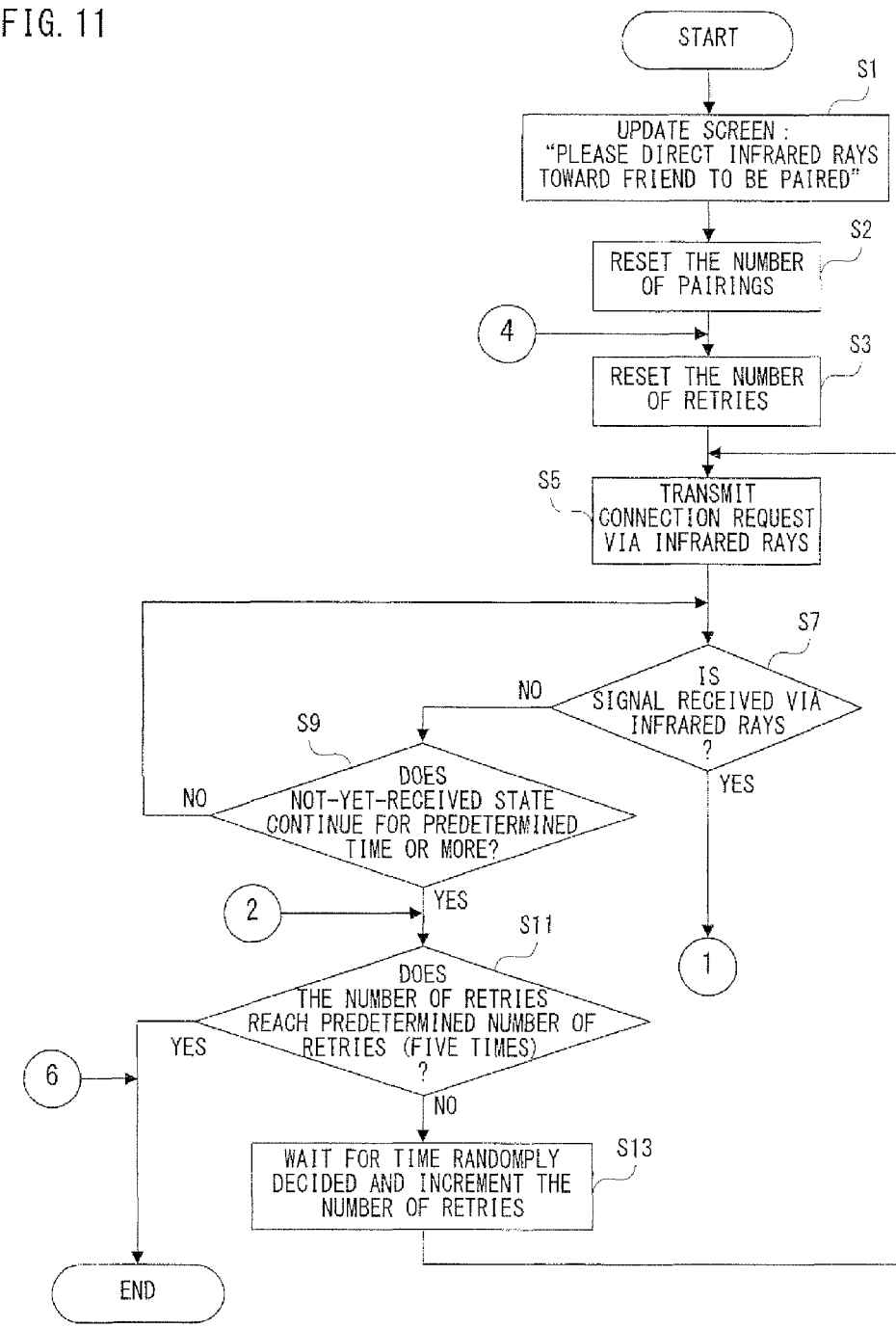
FIG. 11 is a flowchart showing a part of an operation by a CPU.

The operation as described above is implemented by executing processing according to a flowchart shown in FIG. 11 to FIG. 16 by the CPU 42 of each game apparatus 10 on the basis of the programs and data as shown in FIG. 10 that are stored in the main memory 48. That is, when the match-up game in this embodiment is performed, the main memory 48 is formed with a program area 48*a* and a data area 48*b* as shown in FIG. 10. In the program are 48*a*, a game program 70, an input-output controlling program 72, an infrared communication controlling program 74, a wireless communication controlling program 76, etc. are stored.

The game program 70 is a software program for implementing a match-up game by controlling various pieces of hardware (12-40, 44-60) via the CPU 42, and the part (until pairings via the infrared rays are made and then, the wireless communication is established) corresponds the flowchart shown in FIG. 11-FIG. 16. Additionally, the game program 70 is attached with a game ID indicating the kind of the game (title, version, etc.).

The input-output controlling program 72 is a sub software program to be used by the game program 70, and implements an image output, a button input, a touch input, etc. by controlling mainly the lower LCD 12, the operating portion 24, the I/F circuit 40, etc. The infrared communication controlling program 74 is a subprogram to be used by the game program 70, and implements infrared communications with other game apparatuses 10 by controlling mainly the local (infrared rays) communication module 58. The wireless communication controlling program 76 is a subprogram to be used by the game program 70, and implements wireless communications with other game apparatuses 10 by controlling mainly the wireless communication module 56.

The data area 48*b* includes a parameter area 78, a variable area 80, an identifying information (ID list) area 82, a team information area 84, a drawing data area 86, etc. In the parameter area 78, parameters to be referred by the game program 70, such as the number of participants (four), the maximum number of retries (five times) are stored. Here, the values of the parameters can be suitably changed from a menu selection screen, etc. not shown. In the variable area 80, variables to be controlled by the game program 70, such as the number of pairings, the number of retries, a master-and-slave flag are stored.

In the identifying information (ID list) area 82, the self-identifying information like "A" is stored in the initial state, then, each pairing via the infrared rays, the identifying information of the partner is additively written in order, and at a time a wireless communication is established, identifying information of all the game apparatuses 10 like "A, B, C, D" are stored. In the team information area 82, team information created by such identifying information like "(A, B)/(C, D)" is stored. In the drawing data area 86, data for drawing the screens shown in FIG. 9(*a*)-FIG. 9(*d*), for example, is stored.

Now, when the menu selection screen not shown is displayed on the lower LCD12, and the "match-up game" as one option is selected with the touch panel 28, the CPU 42 starts processing according to the flowchart shown in FIG. 11-FIG. 16. The CPU42 updates the screen of the lower LCD 12 as shown in FIG. 9(*a*) in a step S1 in FIG. 11. On the screen in FIG. 9(*a*), a prompt saying that "THIS IS FOUR-PERSON-MATCH-UP GAME . . . PLEASE DIRECT INFRARED RAYS TOWARD PARTNER TO BE PAIRED" is included. Then, in a step S2, the number of pairings being one of the variables stored in the variable area 80 is reset (the number of pairings=0), and in a step S3, the number of retries being one of the variables is reset as well (the number of retries=0).

Next, the CPU42 proceeds to a step S5 to transmit a connection request via infrared rays. The transmission of the connection request may be performed on the basis of an instruction from the user, or may be automatically performed independent from the user's instruction. Here, the signal transmitted via the infrared rays (connection request, response, ACK, etc.: see FIG. 7) is directed to an unspecific partner, and can be transmitted without the identifying information (destination) of the partner. In a next step S7, it is determined whether or not a signal is received via the infrared rays, and if "NO" here, the process shifts to a step S9 to further determine whether or not a not-yet-received state (the determination result in the step S7 is "NO") continues for a predetermined time (10 seconds, for example) or more. If "NO" here, the process returns to the step S7. If "YES" in the step S7, the kind of signal is determined through steps S15 and S17, and the processing corresponding to the determination result (described later) is executed.

If "YES" in the step S9, the process proceeds to a step S11 to determine whether or not the number of retries reaches a predetermined number of times (More specifically, the maximum number of retries being one of the parameters stored in the parameter area 78: 5 times). If "YES" in the step S11, the process is ended whereas if "NO", after a wait for a time randomly decided in a step S13, the process returns to the step S5. During this time, that is, during the wait in the step S13, the number of retries is incremented.

Accordingly, if the positional relationship between the game apparatus 10(A) and the game apparatus 10(B) of the partner is not proper (both apparatuses are so far away from each other, there is no partner, an orientation of the infrared rays is widely displaced), a connection via the infrared rays is not established, and a retry is executed at random time intervals. If a connection is not established even after the five retries, the processing is ended. At this time, an error display showing that a connection is not established may be displayed on the screen. In such a case, the "match-up game" is newly selected on the menu selection screen to thereby restart the processing.

Here, the waiting time in the step S13 is decided every time by utilizing the random numbers by the CPU 42, for example. Or, the waiting times corresponding to the number of retries may be decided in advance, such as 5 seconds in a case that the number of retries is 0, and 4 seconds in a case that the number of retries is 1.

Figure 12:
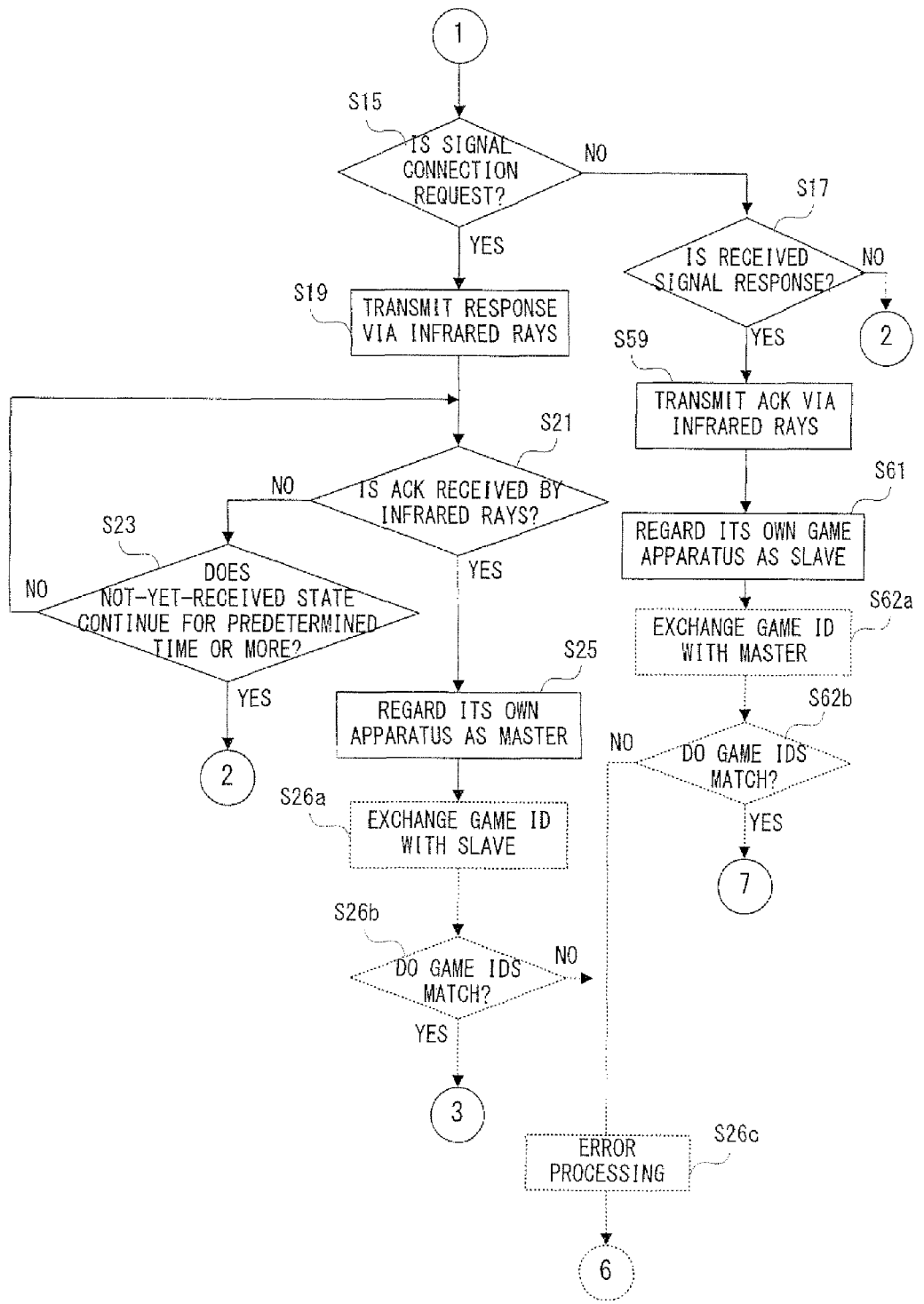
FIG. 12 is a flowchart showing another part of the operation by the CPU.

In a step S15 in FIG. 12, it is determined whether or not the received signal is a connection request, and if "YES" here, processing from steps S19 to S57 being processing for a master is executed, and then the process shifts to the game processing or the process is ended. If "NO" in the step S15, the process shifts to the step S17 to determine whether or not the received signal is a response, and if "YES" here, processing from steps S59 to S89 being processing for a slave is executed, and then the processing shifts to the game processing or the processing is ended. If "NO" in the step S17 as well, the process returns to the step S11. Accordingly, if the received signal is neither the connection request nor the response, the signal is regarded as not being received, and a retry is performed after the number of retries is checked and incremented.

The processing for a master is executed in details below. That is, after "YES" is determined in the step S15, in response to the received signal, that is, the connection request, a response is transmitted via the infrared rays in the first step S19, and it is determined whether or not an ACK is received via the infrared rays in the next step S21. If "NO" in the step S21, the process shifts to the step S23 to determine whether or not a not-yet-received state (the determination result in the step S21 is "NO") continues for a predetermined time (10 seconds, for example) or more, and if "NO" here, the process returns to the step S21. If "YES" in the step S23, the process returns to the step S11. Accordingly, if there is no ACK in response to the transmitted response as well, a retry is performed after the number of retries is checked and incremented.

Figure 13:
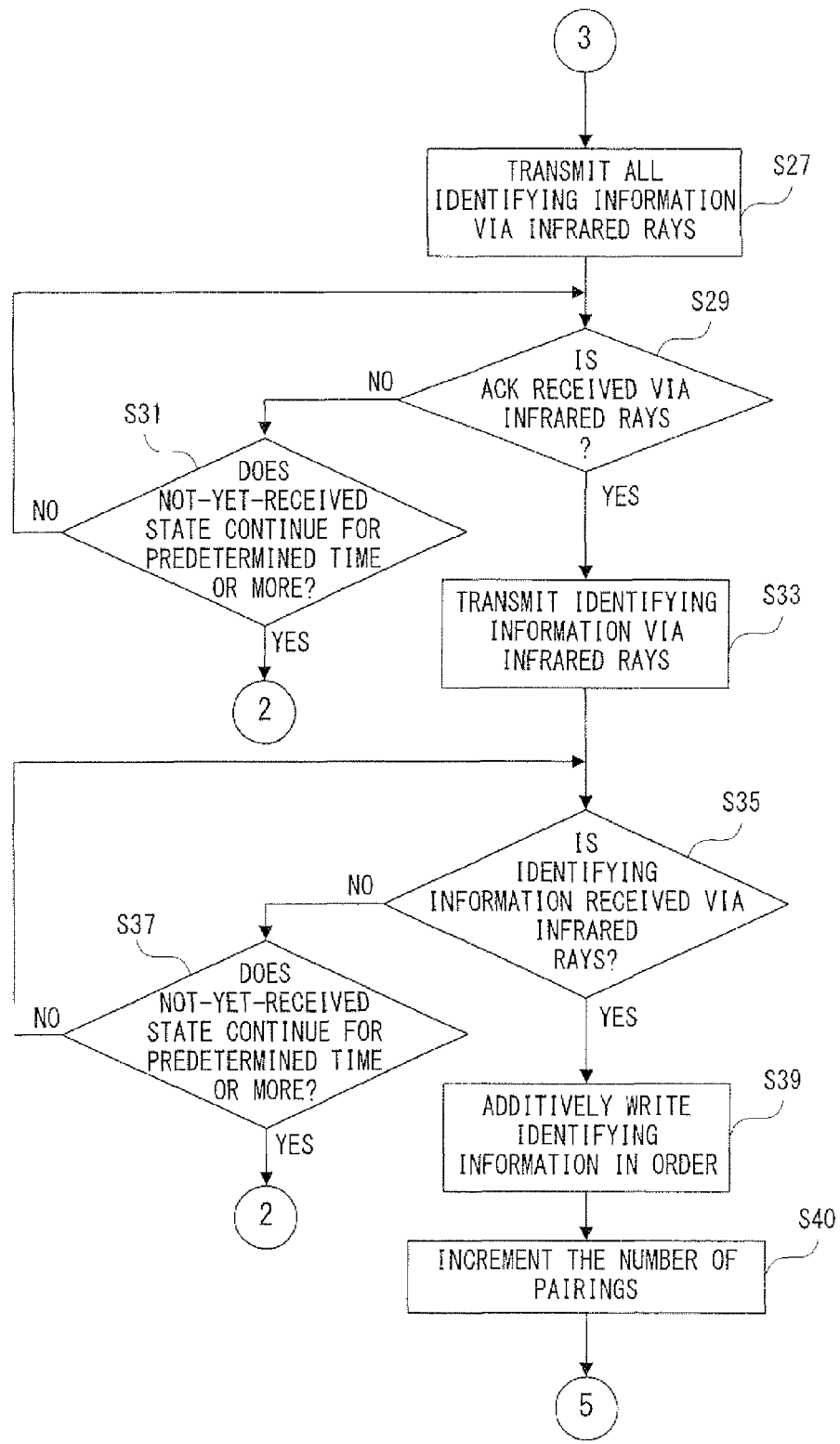
FIG. 13 is a flowchart showing a still another part of the operation by the CPU.

If "YES" in the step S21, by controlling the master-and-slave flag being one of the variables, its own apparatus is regarded as a master in the step S25, and then, the process proceeds to the step S27 shown in FIG. 13 to transmits via the infrared rays a signal indicating all the identifying information possessed by its own apparatus, that is, a signal indicating the content of the identifying information (ID list) area 82.

Here, after the step S25, the step S26a and the step S26b may be executed before the process proceeds to the step S27. This will be explained below.

In the following step S29, it is determined whether or not an ACK is received via the infrared rays, and if "NO" here, the process shifts to the step S31 to determine whether or not a not-yet-received state (the determination result in the step S29 is "NO") continues for a predetermined time (10 seconds, for example) or more, and if "NO" here as well, the process returns to the step S29. If "YES" in the step S31, the process returns to the step S11. Accordingly, if there is no ACK in response to the transmitted identifying information as well, a retry is performed after the number of retries is checked and incremented.

If "YES" in the step S29, the process proceeds to the step S33 to transmit a identifying information request via the infrared rays. In the following step S35, it is determined whether or not the identifying information is received via the infrared rays, and if "NO" here, the process shifts to the step S37 to determine whether or not a not-yet-received state (the determination result in the step S35 is "NO") continues for a predetermined time (10 seconds, for example) or more. If "NO" here as well, the process returns to the step S35. If "YES" in the step S37, the process returns to the step S11. Accordingly, if no identifying information is sent in response to the identifying information request, a retry is performed after the number of retries is checked and incremented.

If "YES" in the step S35, the process proceeds to the step S39 to additively write the received identifying information after the identifying information possessed by its own game apparatus in order. Here, if the identifying information containing the identifying information which has transmitted to the partner by it own machine is transmitted, processing of removing the redundant is required at a time of additive writing. Alternatively, in such a situation, the identifying information may not be additively written, but may be overwritten. However, in a case that the overwriting is performed, the order of the identifying information is equal to the order of the identifying information possessed by the communication partner, that is, the game apparatus 10 as a slave, so that the method of dividing into teams according to the order of the identifying information may not be performed effectively.

Figure 14:
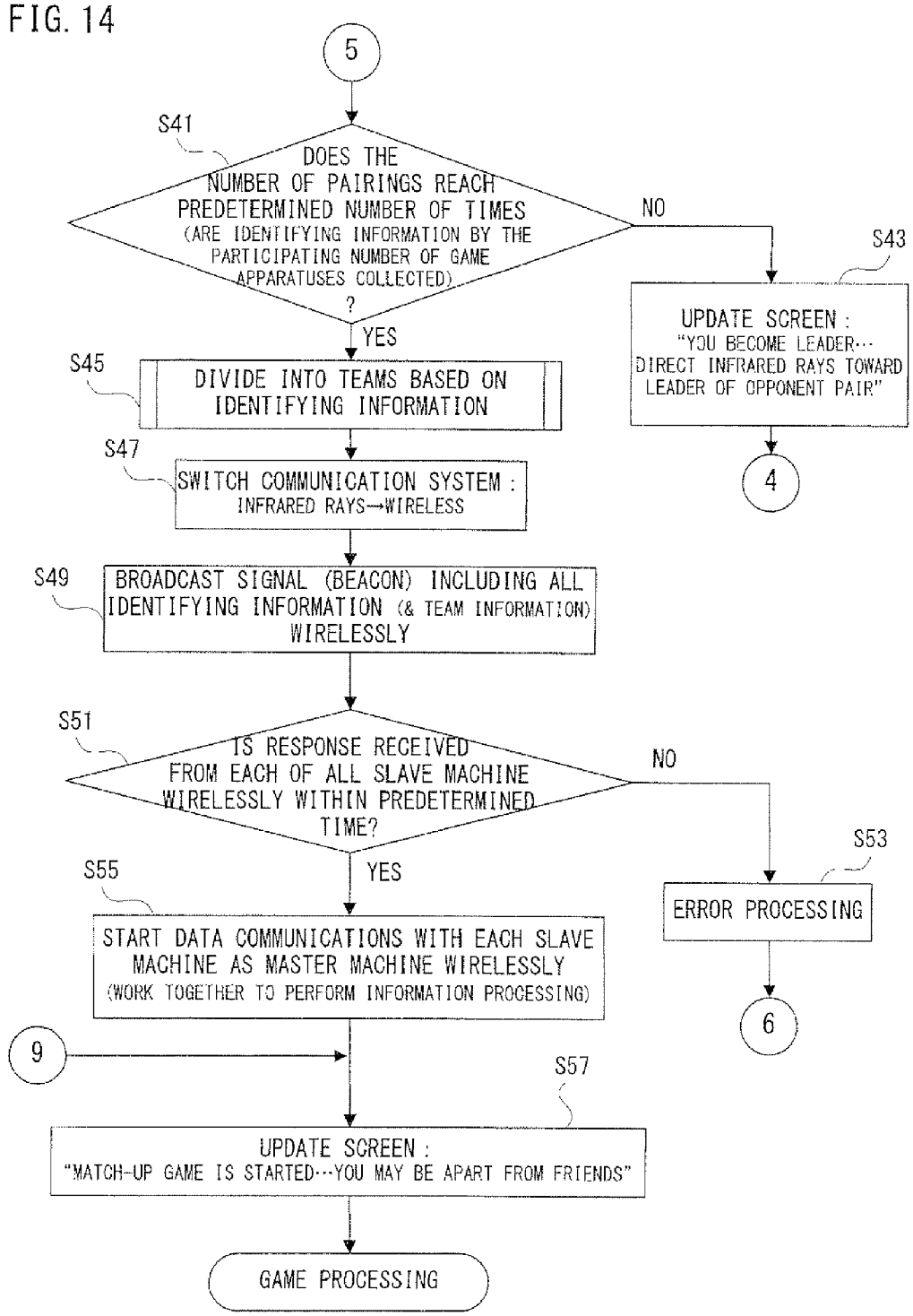
FIG. 14 is a flowchart showing a further part of the operation by the CPU.
Figure 15:
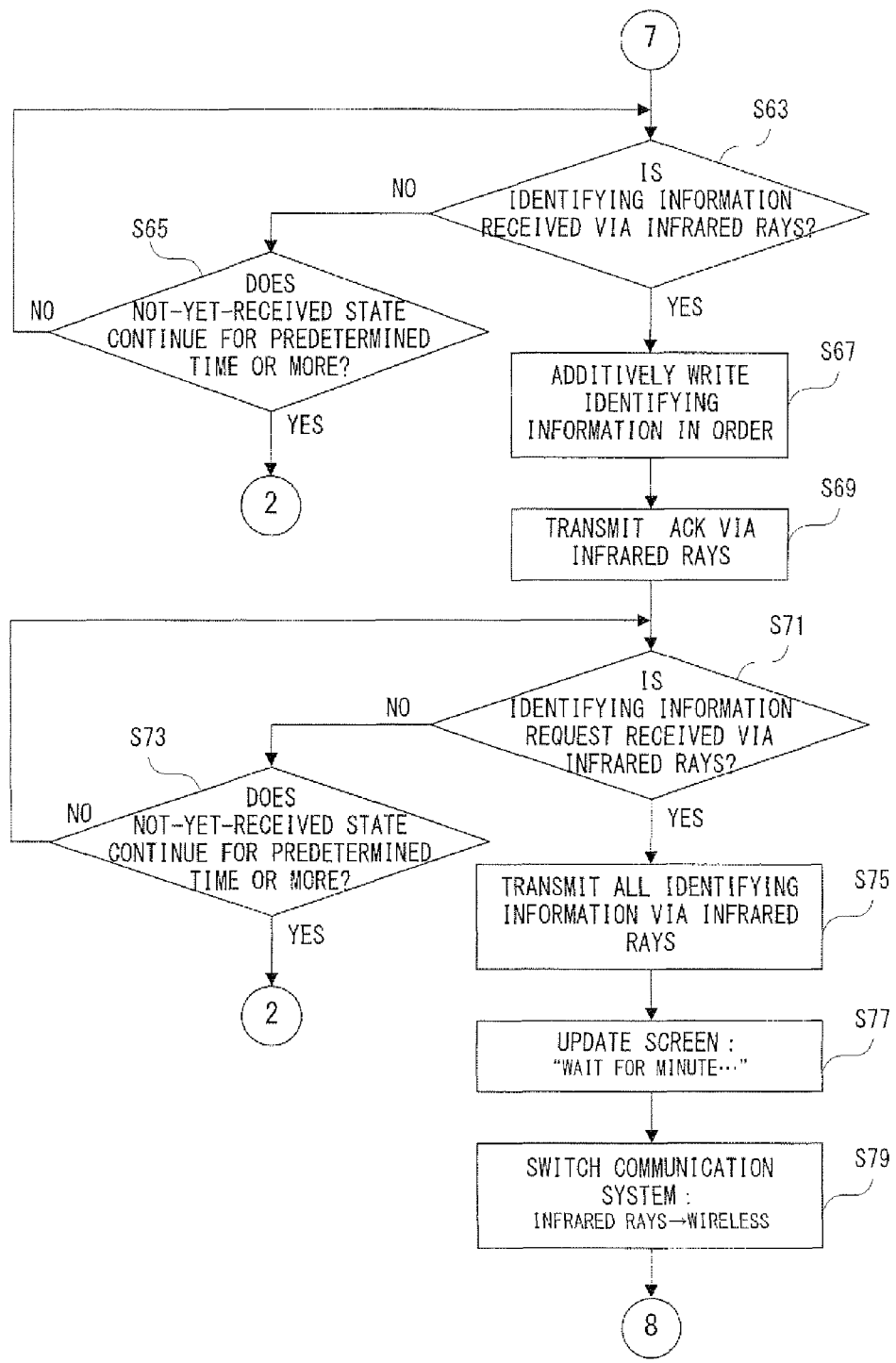
FIG. 15 is a flowchart showing another part of the operation by the CPU.

Then, in the step S40, the number of pairings is incremented, and then, the process proceeds to the step S41 shown in FIG. 14 to determine whether or not the number of pairings reaches a predetermined number of times (two times because the number of participating game apparatuses is 4). Here, the determination is equivalent to the determination whether or not identifying information is collected by the number of participating game apparatuses (4 here). In this case, how many identifying information of the game apparatuses is stored in the identifying information (ID list) area 82 is specifically detected, and if the detected number reaches the number of participating game apparatuses, that is, 4 apparatuses, "YES" is determined, and if it is equal to or less than 3 apparatuses, "NO" may be determined. If "NO" in the step S41, the process shifts to the step S43 to update the screen of the lower LCD 12 as shown in FIG. 9(b). On the screen in FIG. 9(b), a prompt saying that "YOU BECOME LEADER . . . DIRECT INFRARED RAYS TOWARD LEADER OF PARTNER PAIR" is included. Thereafter, the process returns to the step S3 to repeat similar processing. That is, after the number of retries is reset, a pairing with the next partner is performed.

Additionally, in the step S41 in FIG. 14, when the number of pairings reaches a predetermined number of times, or when the number of detected game apparatuses reaches the number of participating game apparatuses, it is determined that the identifying information are collected, but if the number of times its own game apparatus becomes a master is counted, and the result reaches the predetermined number of times, it can be determined that its own game apparatus becomes the only master (eventually, identifying information are collected). Alternatively, when a predetermined operation is performed via the touch panel 28, etc., it may be regarded that its own game apparatus becomes the only master.

If "YES" in the step S41, the process proceeds to the step S45 to divide the game apparatuses into teams for the match-up game on the basis of the identifying information (ID lists) of the four game apparatuses stored in the identifying information (ID list) area 82. Although the explanation by a flow-chart is omitted, in the subroutine, processing of dividing the ID list "A, B, C, D" into halves as shown in FIG. 8(c) is performed, and this makes it possible to obtain team information "(A, B)/(C, D)" on which the pairings in the tournament as shown in FIG. 8(a) are reflected. However, depending on the number of participating game apparatuses or the procedure of the pairing, the game apparatuses are unequally divided as shown in FIG. 17(c) or divided into three or more as shown in FIG. 18(b).

The CPU 42 switches from an infrared rays communication manner to a wireless communication manner by stopping the local communication module 58 and activating the wireless communication module 56. In the next step S49, the CPU 42 broadcasts a signal (beacon) including all the identifying information, that is, the identifying information by the number of participating game apparatuses ("A, B, C, D", for example) stored in the identifying information (ID list) area 82 and the team information ("(A, B)/(C, D)", for example) stored in the team information area 84, and waits for a response in response to the beacon. Then, in the step S51, it is determined whether or not a response is received within a predetermined time (10 seconds, for example) from each of all the slaves (B, C, D, for example) wirelessly.

If there is even one slave which does not respond wirelessly after a lapse of predetermined times from the broad cast, "NO" is determined in the step S51, error processing is executed in the step S53, then, the processing is ended. The error processing includes processing of displaying a message saying that an error occurs, and processing of broadcasting again. Alternatively, when a predetermined time elapses, even if not all the slaves respond, but there is at least one slave which responds, a data communication may be started with only the responding slave in the step S55 described later. In this case, the team information has to be changed, so that the master may divide only the responding slaves and may transmit again new team information via the established wireless communication.

If there are responses from all the slaves wirelessly before a lapse of the predetermined times, the process proceeds from the step S51 to the step S55 to start data communications with each slave machine (B, C, D, for example) wirelessly as a master machine, so that from this point, the four game apparatuses (A to D) work together to execute the game processing with the master machine A being the center. Then, the process proceeds to the step S57 (described later).

On the other hand, the processing as a slave is executed as described below in detail. That is, in FIG. 12, After "YES" is determined in the step S17, in the first step S59, an ACK in response to the received signal, that is, the response is transmitted via the infrared rays, and in the next step S61, the master-and-slave flag is controlled to regard its own game apparatus as a slave. Then, the process proceeds to the step S63 shown in FIG. 15 to determine whether or not the identifying information is received via the infrared rays. If "NO" here, the process shifts to the step S65 to further determine whether or not a not-yet-received state (determination result in the step S63 is "NO") continues for a predetermined time (10 seconds, for example), and if "NO" here as well, the process returns to the step S63. If "YES" in the step S65, the process returns to the step S11. Accordingly, even if the ACK is transmitted, but the identifying information is sent back as well, a retry is performed after the number of retries is checked and incremented.

Here, the step S62a and the step S62b may be executed between the step S61 and the step S63. This may be explained later.

If "YES" in the step S63, the process proceeds to the step S67 to write the received identifying information after the identifying information possessed by its own machine. In the next step S69, an ACK is transmitted via the infrared rays, and in the step S71, it is determined whether or not the identifying information is received via the infrared rays. If "NO" here, the process shifts to the step S73 to further determine whether or no a not-yet-received state (the determination result in the step S71 is "NO") continues for a predetermined time (10 seconds, for example) or more, if "NO" here as well, the process returns to the step S71. If "YES" in the step S73, the process returns to the step S11. Accordingly, even if the ACK is transmitted, but an identifying information request is not sent back as well, a retry is performed after the number of retries is checked and incremented.

If "YES" in the step S71, the process proceeds to the step S75 to transmit a signal indicating all the identifying information possessed by its own machine, that is, a signal indicating the contents of the identifying information (ID list) area 82 via the infrared rays. Here, the identifying information received from the partner in the step S63 may not be included. In the next step S77, the screen on the lower LCD 12 is updated as shown in FIG. 9(c). On the screen shown in FIG. 9(c), a prompt, such as "PLEASE WAIT FOR MOMENT..." is included. Succeedingly, in the step S79, by stopping the local communication module 58 and activating the wireless communication module 56, the communication system is switched from the infrared rays communication to the wireless communication.

Figure 16:
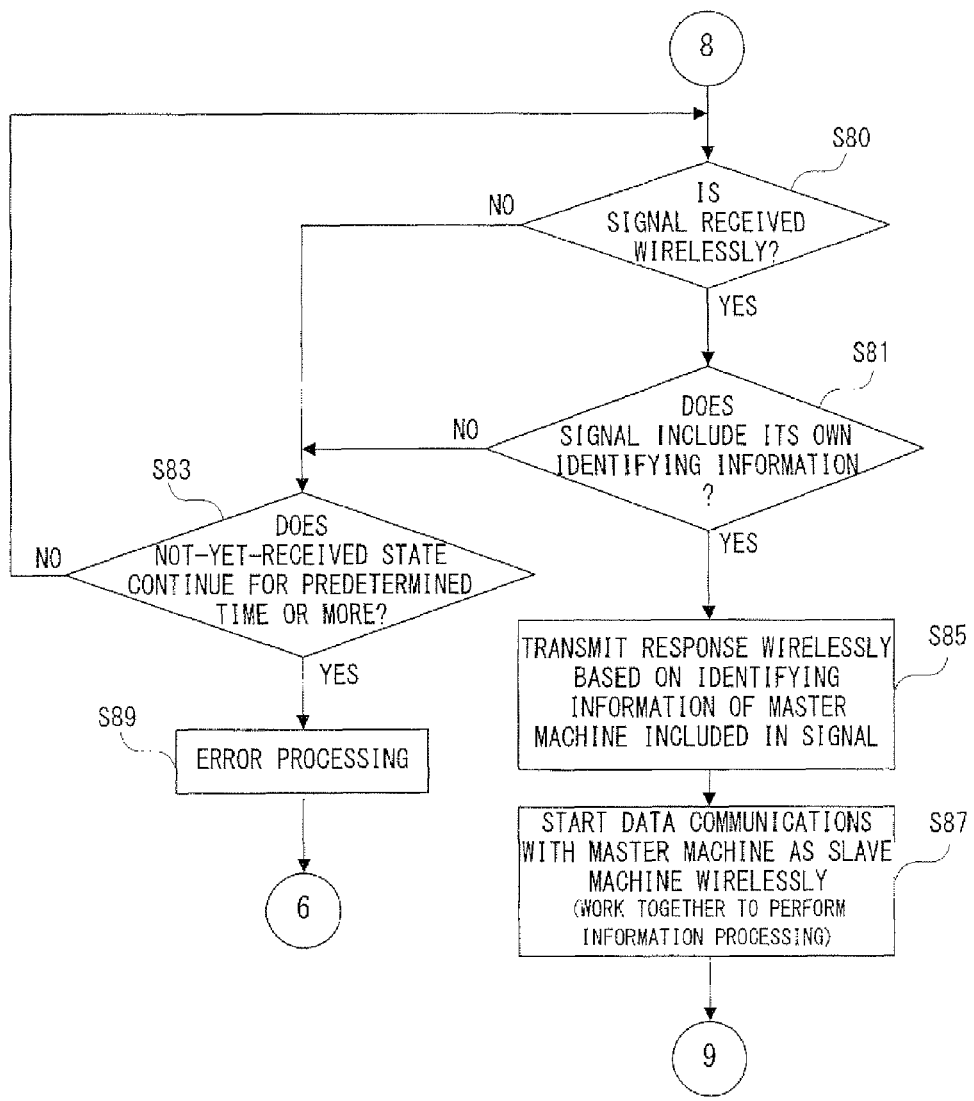
FIG. 16 is a flowchart showing a still another part of the operation by the CPU.

Next, the process proceeds to the step S80 in FIG. 16 to determine whether or not the signal (beacon) is received wirelessly. If "NO" here, the process shifts to the step S83 to determine whether or not a not-yet-received state (determination result in the step S80 is "NO") continues for a predetermined time (10 seconds) or more, and if "NO" here, the process returns to the step S80. If "YES" in the step S80, the process proceeds to the step S81 to further determine whether or not the signal includes the self-identifying information, and if "NO" in the step S81, it is regarded that the signal is not received, and the process shifts to the step S83.

If "YES" in the step S83, error processing is executed in the step S89, and then, the processing is ended. In the error processing, processing of displaying a message saying that an error occurs, for example, is included. Before a lapse of the predetermined times, if the beacon including the self-identifying information is detected, the process proceeds from the step S81 to the step S85 to transmit a response wirelessly on the basis of the identifying information of the master included in the beacon. Then, in the step S87, data communications as a slave machine are started with the master machine wirelessly, and from this point, the four game apparatuses (A to D) work together to execute game processing with the master machine A being the center from this time.

In the step S87 or in the step S57 successive to the above-described step S55, the screen of the lower LCD 12 is updated as shown in FIG. 9(e). On the screen shown in FIG. 9(e), a prompt "MATCH-UP GAME IS STARETED... YOU MAY BE APART FROM FRIEND" is included. The processing by the CPU 42 shifts to the game processing not shown.

In the operation example, when the master and the slave are decided (S25&S61: see FIG. 12), transmission and reception of the identifying information is immediately started via the infrared rays (S27&S63: FIG. 13, see FIG. 15), but this may be started after the game IDs (see FIG. 10) match between the master and the slave. More specifically, after the master and the slave are decided in the steps S25 and S61, in the steps S26a and S62a, the game IDs are exchanged between the master and the slave, and it is determined whether or not both of the game IDs match in the steps S26b and S62b. Then, if the game IDs match with each other, the process proceeds to the steps S27 and S63 to start transmission and reception of the identifying information, and if the IDs do not match with each other, the process is ended after the error processing in the step S26c. In the error processing, processing of notifying that the each other's game IDs do not mach is included. Thus, if the each other's game apparatuses are different in kind and versions, or the like of the match-up game, by confirming the each other's game IDs immediately after the connection over the infrared rays is established, it is possible to inform the user of the mismatch at timing as soon as possible.

Next, one example when the number of participating game apparatuses is different from the power of 2 is shown by using FIG. 17. In FIG. 17, one example of pairings by the tournament system, transitions of the ID lists and a division into teams when five game apparatuses participate are illustrated. Here, since the communication sequence is basically the same as that when the four game apparatuses participate as shown in FIG. 7 (a set of one-to-one infrared communication is merely added), the illustration and detailed explanation are omitted. The flowchart is also omitted because of being the same as FIG. 11-FIG. 16.

Here, the A and the B are paired, and the C and the D are paired. The E has no partner at this point, that is, at a first round. The A and the B in a pair make infrared communications, the A becomes a master for example, and then, they notify the identifying information with each other. The C and D in a pair make an infrared communication, the C, for example, becomes the master, and then, they notify the identifying information with each other. When the pairings, such as (A, B) and (C, D), are established, the first round is ended in the tournament table shown in FIG. 17(a). At this time, the ID lists of A-E are a state after the first round in the second line shown in FIG. 17(b).

Next, the E seeded at the first round newly pairs with one of the C and D in a pair which becomes a master, that is, the C. The C and E in a pair make infrared communications, the E becomes a master, for example, and they notify the identifying information with each other. When the pairing (C, E) is thus established, the second round is ended in the tournament table shown in FIG. 17(*a*). At this time, the ID lists of the A to E is a state after the second round in the third line shown in FIG. 17(*b*).

Next, one out of the C and the E which becomes a master, that is, the E newly pairs with one out of the A and the B which becomes a master, that is, A. The A and E in a pair make infrared communications, the E becomes a master, for example, and they notify the identifying information with each other. When the pairing such as (A, E) is thus established, the third round is ended in the tournament table shown in FIG. 17(*a*). At this point, the ID lists of the A to E is a state after the third round in the forth line shown in FIG. 17(*b*). Then, the only master E becomes a master machine, and the A to D become slave machines.

Next, from the ID list of the E being the master machine, that is, "E, C, D, A, B", team information shown in FIG. 17(*c*), that is, "(E, C, D)/(A, B)" is produced. The team information is obtained by dividing "E, C, D, A, B" into 3:2, that is, the first half and the second half, and corresponds to the pairings at the first and second rounds in the tournament.

Figure 18:
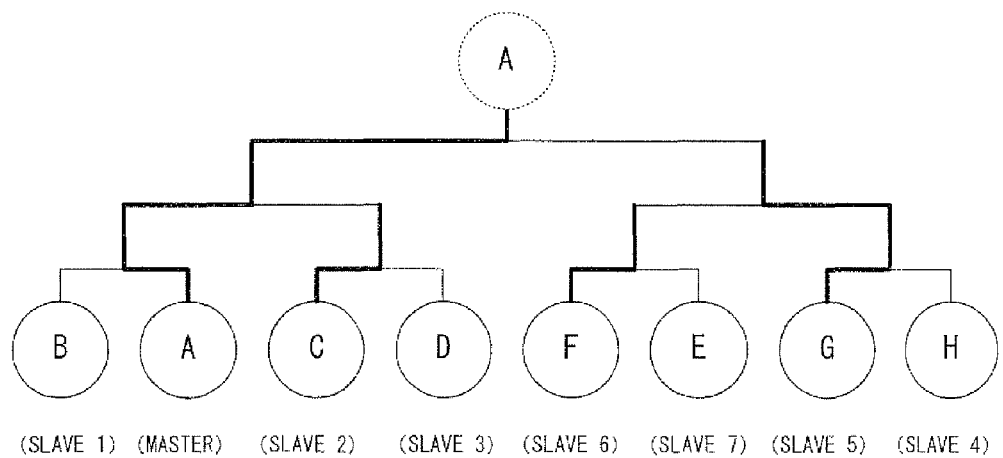
FIG. 18 is an illustrative view showing another example of a pairing performed in a tournament system in a network system in which eight game apparatuses participate.

Alternatively, another example when the number of participating game apparatuses is the power of 2 is explained with reference to FIG. 18. FIG. 18 shows one example of pairings in the tournament system and a division into teams when 8 (=2³) game apparatuses participate. Here, since the communication sequence is basically the same as that when the four game apparatuses participate as shown in FIG. 7 (four sets of one-to-one infrared communications are merely added), the illustration and detailed explanation are omitted. The flowchart is also omitted because of being the same as FIG. 11-FIG. 16.

In the tournament shown in FIG. 18(*a*), pairings (A, B), (C, D), (E, F) and (G, H) are established at the first round, pairings (A, C) and (F, G) are established at the second round, and a (A, G) pairing is established at the third round. At a time of completion of the third round, the only master A becomes the master machine whereas the B to H all become slave machines.

From this procedure, as shown in FIG. 18(*b*), the ID list of the A being the master machine becomes "A, B, C, D, G, H, F, E", and by dividing it to halves, "(A, B, C, D)/(G, H, F, E)" can be obtained as team information. This corresponds to the pairings at the first round and the second round in the tournament.

Alternatively, if the match-up game is played in divided four teams, by dividing the ID list into four, "(A, B)/(C, D)/(G, H)/(F, E)" can be obtained. This corresponds to the pairings at the first round in the tournament.

It should be noted that in each of the above-described operation examples, the number of participating game apparatuses is fixed to 4, 5 or 8 apparatuses, but it may be configured to be selected by the user from some options (2, 4 and 8 apparatuses, for example). Alternatively, within a predetermined range (2-8 apparatuses, for example), the user may designate the arbitrary number (5 apparatuses, for example).

As understood from the above description, in this embodiment, the network system 100 is made up of three or more game apparatuses 10(A), 10(B), 10(C) . . . each storing at least self-identifying information (A, B, C . . . ). Each game apparatus 10 (A, for example) has the wireless communication module 56 and the local communication module 58. The wireless communication module 56 makes it possible to make a one-to-many wireless communication between its own game apparatus and the plurality of game apparatuses 10(B), 10(C) . . . except for its own game apparatus with reference to each of the identifying information (A, B, C . . . ). The local communication module 58 makes it possible to make a one-to-one communication between its own game apparatus and each game apparatus 10(B), 10(C) other than its own game apparatus without reference to each identifying information (A, B, C, . . . ).

The game apparatus 10(A) stores the identifying information (A) of its own game apparatus (10(A)), but does not always store the identifying information (B, C . . . ) of the game apparatus 10(B), 10(C) . . . other than its own game apparatus (10(A)). Thus, if a wireless communication is performed by the wireless communication module 56, the CPU 42 executes pairing processing of first deciding a master and a slave together with any one game apparatus 10 (B, for example) out of the other game apparatuses other than its own game apparatus (10(A)) via the local communication module 58, collecting the identifying information stored in the slave side to the master side, and executes next pairing processing with another game apparatus 10 (C, for example) if its own game apparatus becomes the master, and waits in a case that its own game apparatus becomes the slave (S1-S43, S59-S77). Next, if its own game apparatus (10(A)) becomes the only master as a result of a series of pairing processing, its own game apparatus transmits a signal (beacon, for example) including the identifying information (A, B, C . . . ) of all the game apparatuses 10(A), 10(B), 10(C) . . . including its own game apparatus (10(A)) via the wireless communication module 56 whereas if its own game apparatus (10(A)) becomes a slave, it receives the signal transmitted from the only master via the wireless communication module 56 (S49-S53, S80-S89). Accordingly, the identifying information (A, B, C . . . ) of all the game apparatuses 10(A), 10(B), 10(C) . . . are collected to the game apparatus 10 (A) which becomes a master through a series of pairings, that is, the master machine A, and the game apparatuses 10(B), 10(C) which become slaves through the series of pairings . . . , that is, each slave machine B, C, . . . can receive delivery of the identifying information (A, B, C . . . ) from the master machine A.

Thus, the three or more game apparatuses 10(A), 10(B), 10(C) . . . , each storing only the self-identifying information, can perform pairings by the local communication module 58, and followed by the one-to-many wireless communication by the wireless communication module 56 to thereby execute the match-up game processing. Furthermore, a tournament system in which only the game apparatus 10 which currently becomes a master can advance to a next pairing is adopted, so that the number of pairing processing can be made less than that of the a round robin system in which each communication terminal makes a pairing with all the communication terminal except for its own communication terminal, capable of making a transition from the local communications (infrared rays) to the wireless communications.

Furthermore, in the game apparatus 10(A), the identifying information (A) of its own game apparatus (10(A)) is stored in the identifying information area 82 of the main memory 48, and the CPU 42 collects by additively writing the identifying information (B, C . . . ) notified from the partner in the series of pairing processing in the identifying information area 82 one after another (S39). Then, in a case that its own game apparatus (10(A)) becomes the only master, the respective game apparatuses 10(A), 10(B) are divided into teams on the basis of the order of the identifying information stored in the identifying information area 82 (S45), and the match-up game processing is executed on the basis of the result (team information). This makes it possible to perform a division into teams on which the pairings in the tournament are reflected.

In this embodiment, the team information is created from the identifying information (ID lists) collected through the tournament, but in place of the team information, or in addition thereto, priority information may be created. For example, in the example shown in FIG. 8(c), a describing order of the ID lists "A, B, C, D" can be utilized as priority information as it is. Or, if a high priority is assigned to the first and the third IDs in the ID list, and a low priority is assigned to the second and the fourth IDs in the ID list, the former indicates the A and C which advance to the second round of the tournament, and the latter indicates the B and D which become the slaves at the first round of the pairing. The pairings in the tournament is also reflected on such the priority information to be utilized in the match-up game. Example is that the terminal having a higher priority can use a specific item.

Furthermore, in this embodiment, infrared rays system for a data communication for pairing is used, but other wireless communication systems, if they have a high directivity and/or short coverage area, such as systems to be utilized contactless integrated circuit cards, for example, may be used. In other words, any systems having a narrow coverage area, and allowing only a desired partner to be guided into the coverage area without a multiplicity of unspecific partners from being entered into the coverage area can perform pairings as described above. In addition, if only it can make a communication only with a desired partner out of a plurality of participants, the communication system is not required to be the wireless system, and may be a one-to-one wired system connecting a pair of two game apparatuses 10 by cable.

In addition, in this embodiment, as a deciding method of the master and the slave, a side receiving a connection response becomes a slave, and a side receiving an ACK in response to a connection response becomes a master, but this is not restricted to this method. A method of randomly making one game apparatus 10 a master in pairing and making the other game apparatus 10 a slave, or a method of allowing a user to select between a master and a slave in pairing may be adopted.

On the other hand, for a data communication for the match-up game, a wireless LAN system according to an original protocol on the IEEE802.11 standards to be performed between one master machine and a plurality of slave machines is utilized, but any system, if they have a weaker directivity and a longer coverage area than that of the infrared rays systems (coverage area having a radius of about several meters or more, for example), other wireless communication systems may be utilized. Typically, Bluetooth, ZigBee (both are registered trademark: The communication allowable range is 10 m-100 m) are enumerated.

In the above description, an explanation is made on the game apparatus 10, but this invention can be applied to communication terminals (a cellular phone, a PC, a PDA other than the game apparatus, for example) having a first communication module making a one-to-many wireless communication between its own communication terminal and a plurality of communication terminals other than itself with reference to the identifying information, a second communication module making a one-to-one communication between its own communication terminal and the plurality of communication terminals other than itself without reference to the identifying information, and a computer (CPU).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A network system including first, second and third communication terminals each storing at least self-identifying information, wherein
said first communication terminal comprises
a first communication module for making a wireless communication with said second and third communication terminals with reference to their identifying information,
a second communication module for making a communication with each of said second and third communication terminals without reference to said identifying information,
a pairing unit which executes paring processing of storing and collecting, with said second communication terminal, the identifying information stored in one of said first and second communication terminals into the other of said first and second communication terminals via said second communication module prior to a start of a wireless communication by said first communication module, and further executes next pairing processing of storing and collecting, with said third communication terminal, the identifying information stored in one of said first and third communication terminals into the other of said first and third communication terminals when a first condition requiring that a collection from said second communication terminal to said first communication terminal is done is satisfied in said pairing processing, and
a signal transmitting and receiving unit which transmits a signal including all the collected identifying information to said second and third communication terminals via said first communication module when a second condition requiring that collections from said second and third communication terminals to said first communication terminal are done is satisfied and receives said signal transmitted from said second and/or third communication terminal via said first communication module when a third condition is satisfied, as a result of a series of said pairing processing by said pairing unit.

2. A network system according to claim 1, wherein
said first communication module has a coverage area wider than that of said second communication module.

3. A network system according to claim 1, wherein
said second communication module has a directivity higher than that of said first communication module.

4. A network system according to claim 1, wherein
said first communication terminal waits until a signal from said second and third communication terminals is received via said first communication module when said third condition is satisfied as a result of said pairing processing.

5. A network system according to claim 1, wherein
said first condition is that the identifying information stored in said other of said first and third communication terminals is stored and collected into its own communication terminal in said pairing processing.

6. A network system according to claim 1, wherein
said communication terminal further comprises
a connection request transmitting unit for transmitting a connection request to said second and third communication terminals via said second communication module, and a connection request receiving unit for receiving a connection request from said second and third communication terminals via said second communication module, and said first condition is that said connection request is received.

7. A network system according to claim 1, wherein
said communication terminal further comprises a counting unit for counting the number of pairing processing of storing and collecting the identifying information stored in said second and third communication terminal into its own communication terminal, and
said second condition further requires that the count by said counting unit reaches a predetermined number of times.

8. A network system according to claim 1, wherein
said third condition is satisfied when the identifying information stored in said first communication terminal is stored and collected into said second and third communication terminals in said pairing processing.

9. A network system according to claim 1, wherein
said first communication terminal further comprises a collecting-side-communication-terminal deciding unit for deciding whether or not said first communication terminal is to become a communication terminal on a collecting side in a communication with any of said first and second communication terminals, and
said pairing unit stores and collects the identifying information stored in said second and third communication terminals into said first communication terminal when said collecting-side-communication-terminal deciding unit decides that said first communication terminal is to become the communication terminal on the collecting side.

10. A network system according to claim 9, wherein
said first condition is satisfied when said collecting-side-communication-terminal deciding unit decides that said first communication terminal is to become the communication terminal on the collecting side.

11. A network system according to claim 9, wherein
said third condition is satisfied when said collecting-side-communication-terminal deciding unit decides that said first communication terminal does not become the communication terminal on the collecting side.

12. A network system according to claim 1, wherein
said first communication terminal further comprises a master-and-slave deciding unit for deciding whether said first communication terminal is to become a master or a slave in a communication with any one of said second or third communication terminals,
said pairing unit stores and collects the identifying information stored in said second and third communication terminals into said first communication terminal when said first communication terminal becomes the master by said master-and-slave deciding unit, and stores and collects the identifying information stored in said first communication terminal into said second and third communication terminals when said first communication terminal becomes the slave by said master-and-slave deciding unit.

13. A network system according to claim 12, wherein
said first communication terminal further comprises
a connection request transmitting unit for transmitting a connection request to said second and/or third communication terminals via said second communication module, a connection request receiving unit for receiving said connection request from said second and/or third communication terminal via said second communication module,
a connection response transmitting unit for transmitting via said second communication module a connection response to said second and/or third communication terminal which has transmitted said connection request when said connection request is received and
a connection response receiving unit for receiving said connection response from said second and/or third communication terminal via said second communication module, and
said master-and-slave deciding unit decides that said first communication terminal becomes a master when it receives said connection request, and decides that said first communication terminal becomes a slave when it receives said connection response.

14. A network system according to claim 1, wherein
said first communication terminal further comprises
an identifying information transmitting unit for transmitting the stored identifying information to said second and third communication terminals and
an identifying information receiving unit for receiving the identifying information stored in said second and third communication terminal, and
said pairing unit stores and collects the identifying information into said first communication terminal when the identifying information stored in said second and third communication terminal is received by said identifying information receiving unit, and collects the identifying information into said second and third communication terminal when the identifying information is transmitted to said second and third communication terminal by said identifying information transmitting unit,
said first condition is satisfied when the identifying information stored in said second or third communication terminal is received by said identifying information receiving unit, and
said third condition is satisfied when the identifying information is transmitted to said second and third communication terminal by said identifying information transmitting unit.

15. A network system according to claim 1, wherein
a partner to be subjected to next pairing processing with said first communication terminal for which said first condition has been satisfied in said pairing processing is said second and/or third communication terminal for which said first condition has been satisfied in another pairing processing.

16. A network system according to claim 1, wherein
said first communication terminal further comprises a memory storing self-identifying information, and
said pairing unit collects by additively writing the identifying information in order in said memory through a series of pairing processing.

17. A network system according to claim 1, wherein
said first communication terminal further comprises a processing unit for starting a wireless communication by said first communication module with reference to the identifying information sent or received by said signal transmitting and receiving unit, and executing information processing by operation of said first communication terminal together with each of said second and third communication terminals.

18. A network system according to claim 16, wherein
said first communication terminal further comprises a dividing unit for dividing said first, second and third communication terminal into teams on a basis of an order of the identifying information stored in said memory when said second condition is satisfied, and a processing unit for starting a wireless communication by said first communication module after the transmission or the reception by said signal transmitting and receiving unit, and executing game processing in such a manner as to divide said communication terminals into teams by utilizing a result of said dividing unit to thereby battle between said first communication terminal and said second and third communication terminals.

19. A network system according to claim 1, wherein said first communication terminal further comprises a self-identifying-information determining unit for determining whether or not the self-identifying information is included in said signal when said signal is received by said signal transmitting and receiving unit, and a processing unit for starting a wireless communication with said second and third communication terminal for which said second condition is satisfied via said first communication module with reference to said signal, and executing information processing when said self-identifying-information determining unit determines that the self-identifying information is included in said signal.

20. A first communication terminal storing at least self-identifying information, comprising:

a first communication module for making a wireless communication with second and third communication terminals with reference to their identifying information;

a second communication module for making a communication with said second and third communication terminals without reference to said identifying information;

a pairing unit for executing a pairing processing of storing and collecting with said second communication terminal the identifying information stored in one of said first and second terminals communication into the other of said first and second terminals communication via said second communication module prior to a start of a wireless communication by said first communication module, and further executes next pairing processing of storing and collecting, with said third communication terminal, the identifying information stored in one of said first and second communication terminal into the other of said first and third communication terminals when a first condition requiring that a collection from said second communication terminal to said first communication terminal is done is satisfied in said pairing processing; and a signal transmitting and receiving unit which transmits a signal including all the collected identifying information to said second and third communication terminals via said first communication module when a second condition requiring that collections from said second and third communication terminals to said first communication terminal are done is satisfied and receives said signal transmitted from said second and/or third communication terminal via said first communication module when a third condition is satisfied, as a result of a series of said pairing processing by said pairing unit.

21. A non-transitory storage medium storing a communication program, wherein said communication program causes a computer of a first communication terminal storing at least its own identifying information and having a first communication module for making a wireless communication with second and third communication terminals with reference to identifying information for said second and third communication terminals, and a second communication module for making a communication with said second and third communication terminals without reference to said identifying information, to function as a pairing unit for executing a pairing processing of storing and collecting with said second communication terminal the identifying information stored in one of said first and second terminals communication into the other of said first and second terminals communication via said second communication module prior to a start of a wireless communication by said first communication module, and further executes next pairing processing of storing and collecting, with said third communication terminal, the identifying information stored in one of said first and second communication terminal into the other of said first and third communication terminals when a first condition is satisfied in said pairing processing; and a signal transmitting and receiving unit which transmits a signal including all the collected identifying information to said second and third communication terminals via said first communication module when a second condition requiring that collections from said second and third communication terminals to said first communication terminal are done is satisfied and receives said signal transmitted from said second and/or third communication terminal via said first communication module when a third condition is satisfied, as a result of a series of said pairing processing by said pairing unit.

22. A method of making a communication between four communication terminals each storing at least self-identifying information, and having a first communication module making a wireless communication between said four communication terminals with reference to their identifying information and a second communication module making a communication between arbitrary two communication terminals out of said four communication terminals without reference to said identifying information, wherein said arbitrary two communication terminals make a first pair and the other two said communication terminals make a second pair prior to a start of a wireless communication by said first communication module, first pairing processing is executed by collecting via said second communication module the identifying information stored in one communication terminal into another communication terminal between said two communication terminals being made up of said first pair, and second pairing processing is executed by storing and collecting via said second communication module the identifying information stored in one communication terminal into another communication terminal between said two communication terminals being made up of said second pair, said two communication terminals each of which collects the identifying information in said first and second pairing processing make a third pair, third pairing processing is executed by collecting via said second communication module the identifying information stored in one communication terminal into another communication terminal between said two communication terminals being made up of said third pair, and said communication terminal which collects the identifying information in said third pairing processing transmits a signal including all the collected identifying information via said first communication module whereas said other three communication terminals receives said signal transmitted from said communication terminal which collects the identifying information in said third pairing processing via said first communication module.

23. A network system including first, second and third communication terminals each storing at least self-identifying information, wherein said first communication terminals comprises
- a first communication module for making a wireless communication with said second and third communication terminals with reference to their identifying information,
- a second communication module for making a communication with each of said second and third communication terminals without reference to said identifying information,
- an identifying information receiving unit which receives and stores the identifying information stored in said second communication terminal in a case that a first condition requiring that said first communication terminal becomes a master is satisfied with said second communication terminal via said second communication module, and further receives and stores the identifying information stored in said third communication terminal when said first condition is satisfied with said third communication terminal, and
- a signal transmitting unit which transmits a signal including all the received identifying information to said second and third communication terminals via said first communication module when a second condition is satisfied as a result of a series of the receiving processing by said identifying information receiving unit.

24. A network system according to claim 23, wherein
said first communication terminals further comprises
- a connection request transmitting unit for transmitting a connection request to said second and third communication terminal via said second communication module, and
- a connection request receiving unit for receiving said connection request from said second and third communication terminal via said second communication module, and said first condition is that said connection request is received.

* * * * *